United States Patent
Matthews et al.

(10) Patent No.: US 9,785,367 B2
(45) Date of Patent: Oct. 10, 2017

(54) SYSTEM AND METHOD FOR ENABLING HIGH READ RATES TO DATA ELEMENT LISTS

(71) Applicant: Innovium, Inc., San Jose, CA (US)

(72) Inventors: William Brad Matthews, San Jose, CA (US); Bruce H. Kwan, Sunnyvale, CA (US); Mohammad K. Issa, Los Altos, CA (US); Neil Barrett, Palo Alto, CA (US); Avinash Gyanendra Mani, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 15/192,820

(22) Filed: Jun. 24, 2016

(65) Prior Publication Data

US 2017/0017423 A1    Jan. 19, 2017

Related U.S. Application Data

(63) Continuation of application No. 14/975,585, filed on Dec. 18, 2015, which is a continuation-in-part of application No. 14/800,654, filed on Jul. 15, 2015.

(60) Provisional application No. 62/209,215, filed on Aug. 24, 2015.

(51) Int. Cl.
| | |
|---|---|
| *G06F 13/00* | (2006.01) |
| *G06F 3/06* | (2006.01) |
| *G06F 12/02* | (2006.01) |
| *G06F 13/16* | (2006.01) |

(52) U.S. Cl.
CPC ............ *G06F 3/0619* (2013.01); *G06F 3/067* (2013.01); *G06F 3/0629* (2013.01); *G06F 12/0246* (2013.01); *G06F 12/0253* (2013.01); *G06F 13/1668* (2013.01)

(58) Field of Classification Search
CPC ...... G06F 3/0619; G06F 3/0629; G06F 3/067; G06F 3/1668; G06F 12/0253; G06F 12/0646; G06F 13/1668
USPC ................ 711/162, 163, 170; 709/226, 229; 710/26, 33, 303, 314; 712/225, 245
See application file for complete search history.

(56) References Cited

U.S. PATENT DOCUMENTS

| | | | |
|---|---|---|---|
| 5,093,910 A | 3/1992 | Tulpule et al. | |
| 6,032,207 A | 2/2000 | Wilson | |
| 6,117,185 A | 9/2000 | Schmidt | |
| 7,321,951 B2 | 1/2008 | Wong et al. | |

(Continued)

OTHER PUBLICATIONS

Office Action in U.S. Appl. No. 14/800,649, mailed Sep. 13, 2016.
(Continued)

*Primary Examiner* — Reba I Elmore
(74) *Attorney, Agent, or Firm* — Fish & Richardson P.C.

(57) ABSTRACT

A memory system for a network device is described. The memory system includes a main memory configured to store one or more data elements. Further, the memory system includes a link memory that is configured to maintain one or more pointers to interconnect the one or more data elements stored in the main memory. The memory system also includes a free-entry manager that is configured to generate an available bank set including one or more locations in the link memory. In addition, the memory system includes a context manager that is configured to maintain metadata for a list of the one or more data elements.

24 Claims, 28 Drawing Sheets

(56) References Cited

U.S. PATENT DOCUMENTS

| | | | |
|---|---|---|---|
| 7,349,382 B2* | 3/2008 | Marimuthu | G06F 17/30982 370/351 |
| 7,627,870 B1 | 12/2009 | Michaeli et al. | |
| 7,793,146 B1* | 9/2010 | Gibson | G06F 11/1076 711/114 |
| 8,126,927 B1 | 2/2012 | Binshtock et al. | |
| 8,515,911 B1 | 8/2013 | Zhou et al. | |
| 8,600,953 B1 | 12/2013 | Gerber | |
| 2001/0026497 A1 | 10/2001 | Manning | |
| 2003/0061597 A1 | 3/2003 | Curtis et al. | |
| 2003/0120835 A1* | 6/2003 | Kale | G06F 13/28 710/22 |
| 2003/0196024 A1* | 10/2003 | Frank | G06F 12/0886 711/3 |
| 2003/0235189 A1 | 12/2003 | Mathews et al. | |
| 2004/0221120 A1* | 11/2004 | Abrashkevich | G06F 12/023 711/170 |
| 2004/0260674 A1 | 12/2004 | Primm | |
| 2004/0268067 A1 | 12/2004 | Yamagami | |
| 2006/0206536 A1 | 9/2006 | Sawdon et al. | |
| 2006/0268867 A1 | 11/2006 | Hashimoto | |
| 2006/0294118 A1 | 12/2006 | Lubbers et al. | |
| 2007/0043561 A1* | 2/2007 | Helbing | G10L 15/08 704/231 |
| 2007/0136385 A1* | 6/2007 | Abrashkevich | G06F 11/366 |
| 2007/0198979 A1 | 8/2007 | Dice et al. | |
| 2009/0006804 A1 | 1/2009 | Lubbers et al. | |
| 2009/0132563 A1 | 5/2009 | Herlihy et al. | |
| 2009/0164437 A1 | 6/2009 | Torbjornsen | |
| 2010/0030809 A1 | 2/2010 | Nath | |
| 2010/0064073 A1* | 3/2010 | Schroth | G06F 13/124 710/52 |
| 2010/0125554 A1* | 5/2010 | Jennings | G06F 9/4418 707/674 |
| 2010/0306467 A1 | 12/2010 | Pruthi et al. | |
| 2010/0318749 A1 | 12/2010 | Matthews | |
| 2010/0325181 A1* | 12/2010 | Skillcorn | G06F 17/30091 707/829 |
| 2011/0087854 A1 | 4/2011 | Rushworth et al. | |
| 2011/0164618 A1 | 7/2011 | Sindhu et al. | |
| 2011/0167192 A1 | 7/2011 | Iyer et al. | |
| 2011/0185106 A1 | 7/2011 | Yano et al. | |
| 2011/0196985 A1 | 8/2011 | Li et al. | |
| 2012/0011166 A1 | 1/2012 | Soulard et al. | |
| 2012/0197868 A1 | 8/2012 | Fauser et al. | |
| 2012/0203739 A1 | 8/2012 | Soundararajan et al. | |
| 2013/0019051 A1 | 1/2013 | Somanache et al. | |
| 2013/0036274 A1 | 2/2013 | Bouchard et al. | |
| 2013/0086332 A1 | 4/2013 | Mital et al. | |
| 2013/0091499 A1 | 4/2013 | Soundararajan et al. | |
| 2013/0121341 A1 | 5/2013 | Agrawal | |
| 2013/0151467 A1 | 6/2013 | Krishnan et al. | |
| 2013/0198854 A1* | 8/2013 | Erway | H04L 9/008 726/27 |
| 2013/0215886 A1 | 8/2013 | Sindhu et al. | |
| 2013/0275712 A1 | 10/2013 | Rushworth et al. | |
| 2013/0339569 A1 | 12/2013 | Yochai et al. | |
| 2014/0012963 A1 | 1/2014 | Swenson et al. | |
| 2014/0059311 A1 | 2/2014 | Oberhofer et al. | |
| 2014/0250088 A1 | 9/2014 | Klose | |
| 2014/0281119 A1* | 9/2014 | Hyun | G06F 12/0238 711/102 |
| 2014/0344536 A1 | 11/2014 | Benisty et al. | |
| 2014/0351535 A1* | 11/2014 | Santry | G06F 3/065 711/162 |
| 2015/0237180 A1 | 8/2015 | Swartzentruber et al. | |
| 2015/0270015 A1 | 9/2015 | Murphy et al. | |
| 2015/0295883 A1 | 10/2015 | Suram et al. | |
| 2015/0340033 A1* | 11/2015 | Di Fabbrizio | G10L 15/18 704/254 |
| 2015/0355981 A1 | 12/2015 | Booss et al. | |
| 2016/0147827 A1 | 5/2016 | Diaconu et al. | |
| 2016/0154835 A1* | 6/2016 | Dickie | G06F 17/30315 707/693 |
| 2016/0179865 A1* | 6/2016 | Bortnikov | G06F 17/30362 707/704 |
| 2016/0292079 A1 | 10/2016 | Musoll | |

OTHER PUBLICATIONS

Office Action in U.S. Appl. No. 14/800,654, mailed Sep. 13, 2016.
Office Action in U.S. Appl. No. 14/975,585, mailed Sep. 8, 2016.
Office Action in U.S. Appl. No. 14/975,634, mailed Sep. 9, 2016.
Office Action in U.S. Appl. No. 15/192,517, mailed Aug. 12, 2016.
Office Action in U.S. Appl. No. 15/192,595, mailed Aug. 26, 2016.
Office Action in U.S. Appl. No. 15/192,882, mailed Aug. 5, 2016.
International Search Report and Written Opinion for International Application No. PCT/US2016/042275, mailed Sep. 26, 2016.
International Search Report and Written Opinion for International Application No. PCT/US2016/042292, mailed Sep. 26, 2016.
International Search Report and Written Opinion for International Application No. PCT/US2016/042303, mailed Oct. 7, 2016.
International Search Report and Written Opinion for International Application No. PCT/US2016/042312, mailed Oct. 20, 2016.
United States Office Action in U.S. Appl. No. 15/192,820, dated Sep. 7, 2016.
United States Office Action in U.S. Appl. No. 14/975,585, dated Sep. 8, 2016.
International Search Report in International Application No. 105122268, dated Apr. 21, 2017, 12 pages (with English translation).

* cited by examiner

SYSTEM AND METHOD FOR ENABLING HIGH READ RATES TO DATA ELEMENT LISTS

CROSS-REFERENCE TO RELATED APPLICATIONS

This is a continuation of U.S. patent application Ser. No. 14/975,585, filed on Dec. 18, 2015, which is a continuation-in-part of U.S. patent application Ser. No. 14/800,654, filed on Jul. 15, 2015, and claims priority from U.S. Provisional Patent Application No. 62/209,215, filed on Aug. 24, 2015, each of which is hereby incorporated by reference in their entirety.

FIELD

Embodiments of the invention relate to network devices. In particular, embodiments of the invention relate to memory systems for network devices.

BACKGROUND

Network devices are used to transfer data between nodes in a network. As the networks grow and the data rates of communication channels increase, the need to increase the amount of data a network device can handle within a period of time arises. To meet the demands of these networks, devices need memory systems designed to read data into and write data out of memory to accommodate the demands of the network and to minimize any collisions between read requests and write requests. Current systems meet the high capacity and high data rate demands of networks by increasing the number of access ports of a memory and/or increasing the clock speed of the memory, which requires state of the art semiconductor technologies. However, increasing the number of access ports on the memory and/or using state of the art semiconductor technologies to increase the operating frequency of memory significantly adds to the cost of the memory and/or to the power budget required to operate these memories.

SUMMARY

A memory system for a network device is described. The memory system includes a main memory configured to store one or more data elements. Further, the memory system includes a link memory that is configured to maintain one or more pointers to interconnect the one or more data elements stored in the main memory. The memory system also includes a free-entry manager that is configured to generate an available bank set including one or more locations in the link memory. In addition, the memory system includes a context manager that is configured to maintain metadata for multiple lists, where each list contains one or more data elements.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a system and method for implementing a distributed-linked list for network devices are described. In particular, a memory system is described that is configured to manage data by implementing a distributed-linked list. The memory system includes a main memory for storing data received by a network device. Further, the memory system includes a distributed-linked list. The distributed-linked list includes a link memory, a free entry manager, and a context manager. The distributed-linked list is configured to track the locations of data stored in a main memory and bind the locations to a list to maintain a sequential relationship between the data. Further, the distributed-linked list uses banked memory structures to maintain a sequential relationship between the data stored in a main memory without the need for a direct relationship between the main memory and the distributed-linked list. Such an architecture provides the ability to use single port memory and lower operating frequencies which lowers the cost and complexity of the memory system while still meeting the performance demands of a high capacity network.

Figure 1:
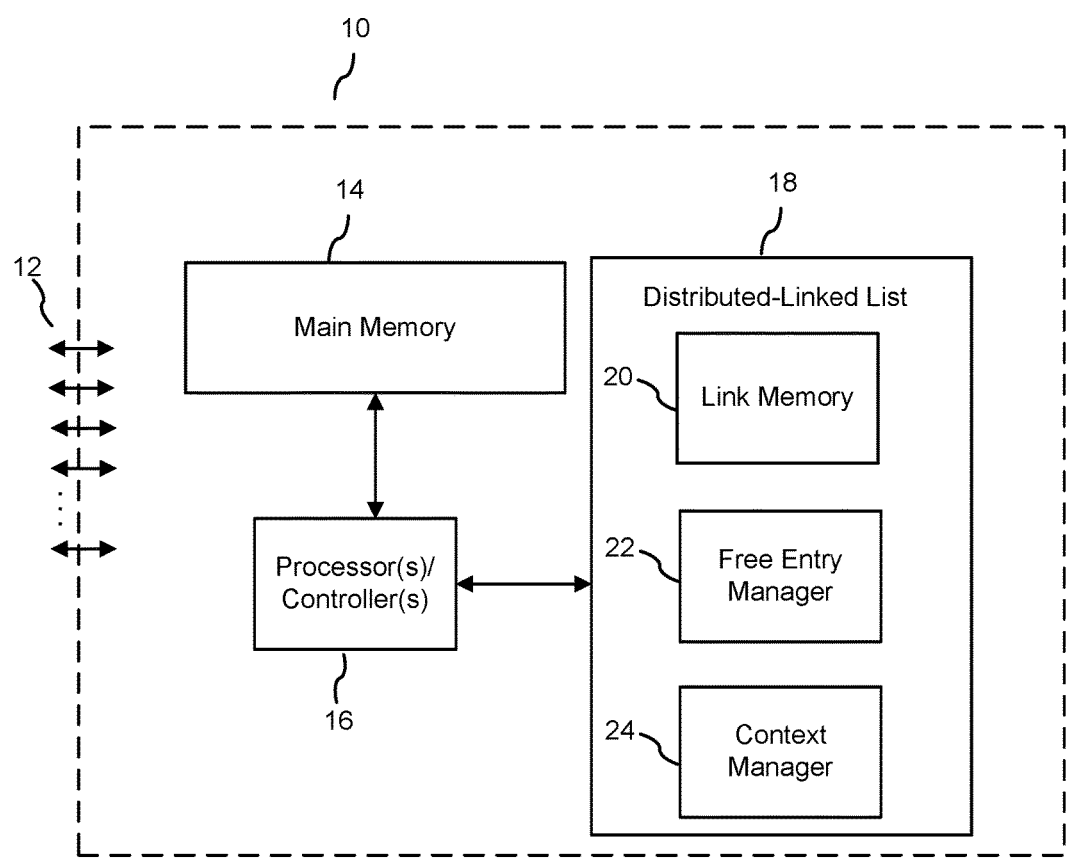
FIG. 1 illustrates a block diagram of a network device including a memory system implementing distributed-linked lists according to an embodiment.

FIG. 1 illustrates a block diagram of a network device including a memory system implementing distributed-linked lists according to an embodiment. Specifically, FIG. 1 illustrates a network device 10 including a plurality of input/output ports 12. Data packets are received and transmitted through the ports 12 using techniques including those known in the art. The ports 12 are coupled with a main memory 14. A main memory may include memory technologies including, but not limited to, dynamic random-access memory ("DRAM"), static random-access memory ("SRAM"), flash memory, and other technologies used to store data including those known in the art.

The main memory 14 is coupled with one or more processors 16. A processor 16 may include, without limitation, a central processing unit ("CPU"), a controller, an application-specific integrated circuit ("ASIC"), field-programmable gate arrays ("FPGA"), or other types of control units. The one or more processors 16 are configured to manage access to the main memory 14 using techniques including those known in the art. For example, the one or more processors 16 are configured to determine a location to store data received on one or more ports 12. The one or more processors 16 are also configured to read data stored in the main memory 14 when the data is to be transmitted on one or more ports 12. Further, the one or more processors 16 are configured to overwrite, update, and invalidate memory locations using techniques including those known in the art.

Further, the embodiment illustrated in FIG. 1 includes a distributed-linked list 18. The distributed-linked list 18 is coupled with one or more processors 16. Further, the distributed-linked list 18 includes a link memory 20, a free entry manager 22, and a context manager 24. The link memory 20 is configured to maintain metadata to interconnect data elements stored in the main memory 14. For an embodiment, maintaining metadata includes generating, storing, and updating metadata using techniques including those described herein. In addition, the link memory 20 is configured to store metadata including one or more pointers to reference data elements stored in the main memory 14. The link memory 20 may include one or more of the memory technologies as described herein. The link memory 20 includes a plurality of locations for storing information. Each of the plurality of locations has an address used to access data stored in the location. For an embodiment, link memory 20 includes a plurality of memory banks with each of the memory banks including a plurality of locations and each location having an address used to access data.

A distributed-linked list 18, according to the embodiment illustrated in FIG. 1, also includes a free entry manager 22.

The free entry manager 22 is configured to generate an available bank set of locations in the link memory 20. The available bank set is a group of one or more addresses in the link memory 20 that are not in use or allocated. For an embodiment, the one or more addresses reside in different memory banks of the link memory. For example, the free entry manager 22 is configured to maintain a list of one or more addresses of the locations in memory that are not used or allocated for storing metadata for a data element currently stored in the main memory 14 as an available bank set. For an embodiment, a free entry manager 22 uses one or more memory technologies including those known in the art for storing an available bank set. For an embodiment, the one or more processors 16 are configured to remove a link memory address from the free entry manager 22 when a link memory address is used or allocated to interconnect data elements stored in a main memory 14. Further, the one or more processors 16 are configured to add a link memory address to the free entry manager 22 after the link memory address is no longer in use. For example, once a data element is read from main memory 14, the one or more processors 16 are configured to deallocate or invalidate a location of link memory 20 associated with the data element, which includes writing the address of the location in the free entry manager 22.

According to the embodiment illustrated in FIG. 1, the distributed linked list includes a context manager 24. The context manager 24 is configured to maintain metadata including pointers that interconnect one or more data elements stored in the main memory 14. For an embodiment, the context manager 24 maintains metadata including a head address, or the address in the link memory 20 for the first entry in a list, and a tail address, the address in the link memory 20 for the last entry in the list stored in the link memory 20. For an embodiment, the memory system implementing a distributed-linked list as described herein provides the benefit of delinking the main memory from the link memory. The delinking provides the use of more efficient memory technologies and architecture including, but not limited to, using single port memory and using memory with lower clock rates. This provides the use of lower cost memory technologies and lower power consumption while meeting the needs of a high-speed, high-capacity network device.

Figure 2:
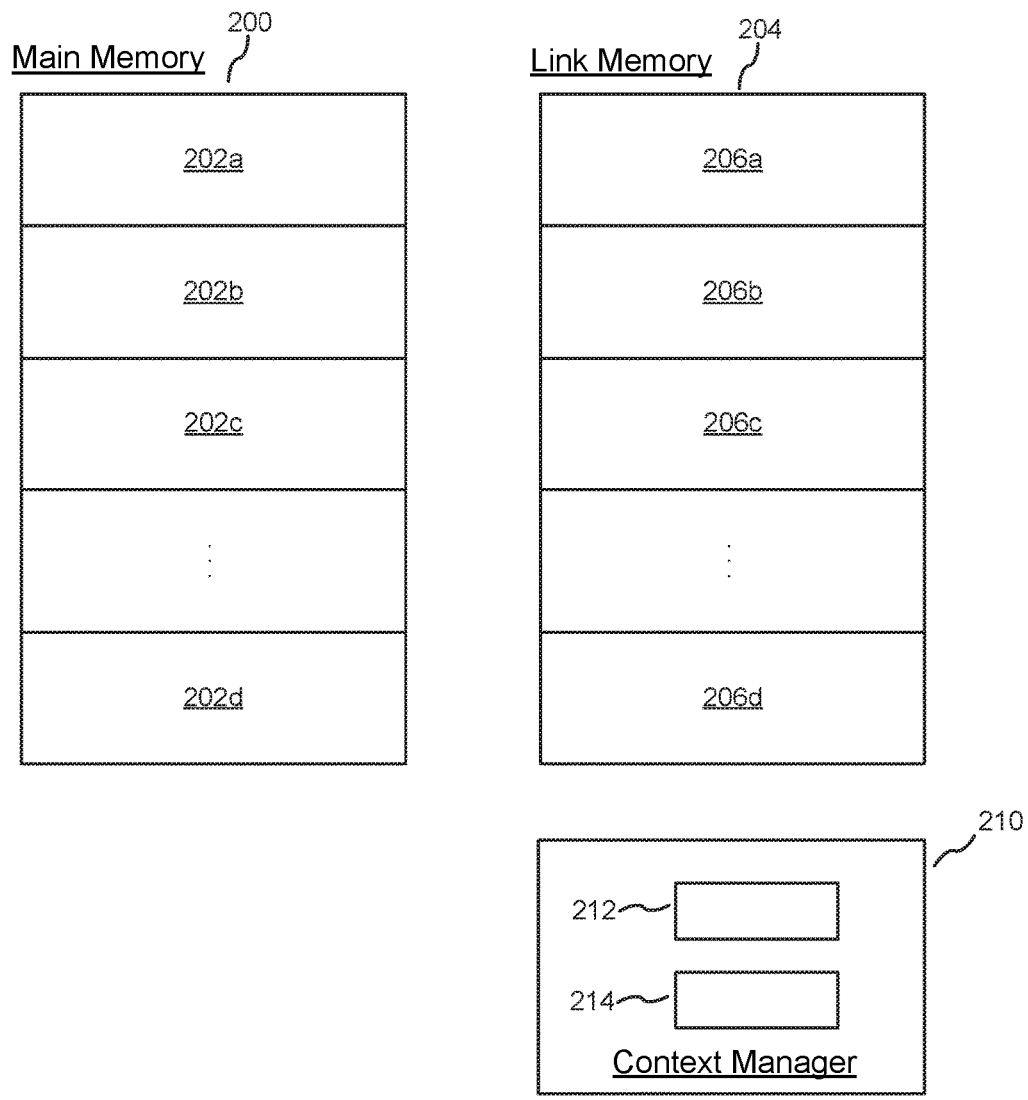
FIG. 2 illustrates a block diagram of a portion of a memory system according to an embodiment.

FIG. 2 illustrates a block diagram of a portion of a memory system according to an embodiment. The portion of a memory system includes a main memory 200, a link memory 204, and a context manager 210. The main memory 200 includes one or more locations 202a-d for storing data elements. A data element includes, but is not limited to, a data packet or a cell of a data packet. As is known in the art, a data packet may be split up into a plurality of cells. These locations 202a-d are accessed using addresses associated with each of the one or more locations 202a-d using techniques including those known in the art. The link memory 204 also includes locations 206a-d for storing metadata to generate one or more lists. For example, the processor 16 is configured to write metadata into the locations 206a-d that interconnect the locations 202a-d to form entries in the list. The list maintains an order of the sequence that the data elements stored in the main memory 200 should be read from the main memory 200. The order may be based on one or more of first-in, first out (FIFO), priority, or other criteria including those known in the art for network devices.

For an embodiment, the link memory 204 is configured to store metadata, such as one or more pointers, used to interconnect entries to form one or more lists of the data elements stored in main memory. For an embodiment, metadata, such as a pointer, stored in the link memory 204 specifies the address of a location within the link memory 204 of the next entry in the list. In addition to a pointer, a location 206a-d in the link memory 204 includes, according to an embodiment, other metadata including, but not limited to, a sequence identifier (e.g., a data-element sequence identifier) and an address of a location in the main memory for a data element. A sequence identifier denotes the order or sequence that data elements and snapshots are to be read from memory. For an embodiment, a data-element sequence identifier is based on the order the data elements were received at a network device. Moreover, the link memory 204 is configured to store the address in a location 206a-d of the link memory 204 for the location 202a-d in main memory 200 which a data element was stored.

The embodiment illustrated in FIG. 2 also includes a context manager 210. The context manager 210 is configured to maintain metadata for one or more lists, where each list includes one or more data elements. Specifically, the context manager 210 includes a head entry 212 and a tail entry 214 configured to store metadata for the head or first entry of a list and the tail or the last entry of the list. The metadata for the head and the tail, for an embodiment, is stored in one or more registers. However, one skilled in the art would understand that other memory technologies could be used including those described herein. The metadata stored in the head entry 212 includes the address of the location 202a-d in the main memory 200 where the first entry of a list is stored. The metadata stored in the head entry 212 also includes a pointer to the location 206a-d of the next entry in a list. For example, the pointer is an address to a location 206a-d in the link memory 204 that is the next entry in the list. In addition, the head entry 212 may include a data-element sequence identifier of the data element. The tail entry 214 includes one or more of the type of metadata described above, but for the last entry in a list. In the case, that a list includes only one data element, the head entry 212 and the tail entry 214 would include the same metadata. For an embodiment, one or more processors are used to update, overwrite, and invalidate the metadata in the head entry 212 and the tail entry 214 as data elements are stored in or read from the main memory 200.

Figure 3:
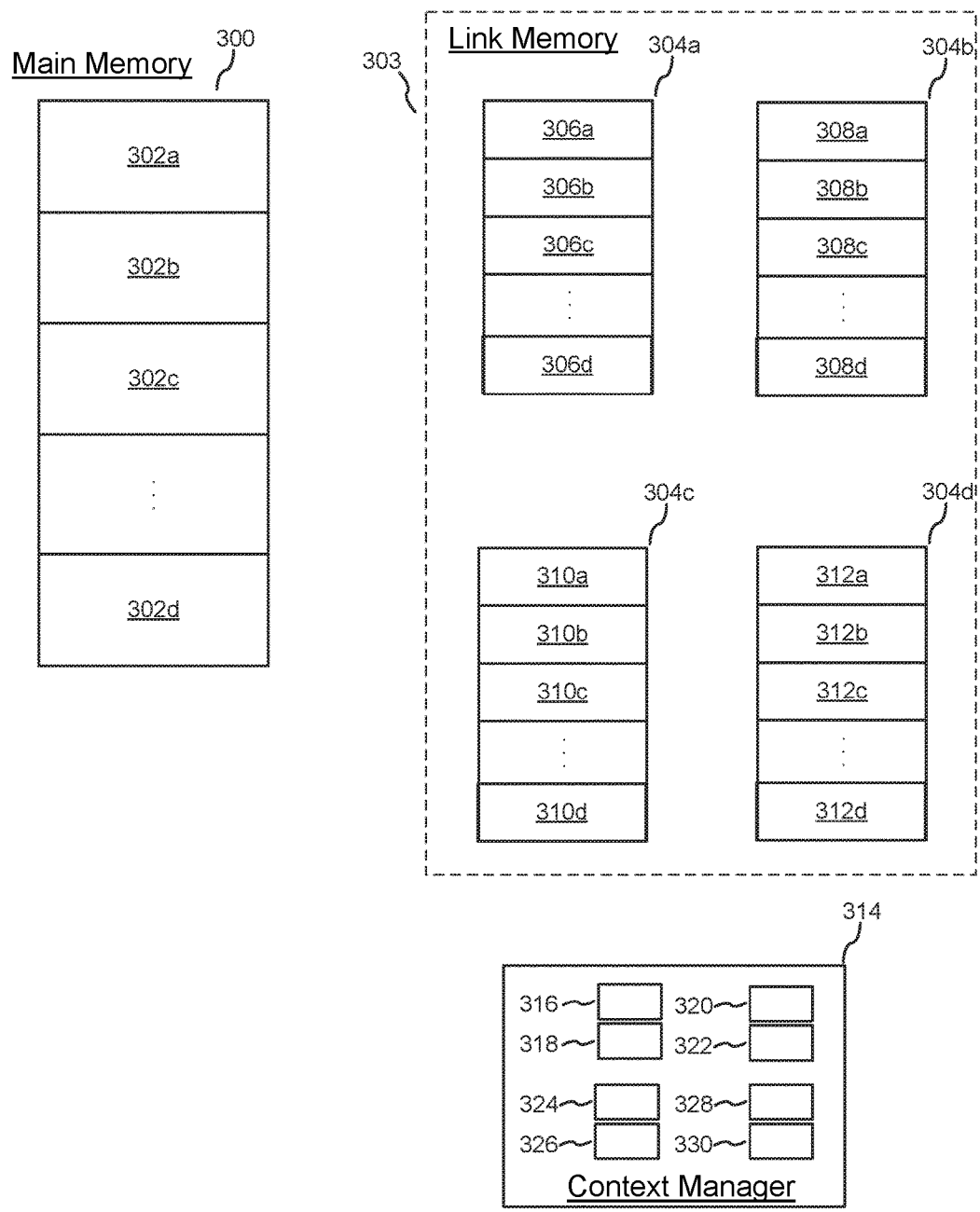
FIG. 3 illustrates a block diagram of a portion of a memory system including multiple banks of link memory according to an embodiment.

FIG. 3 illustrates a block diagram of a portion of a memory system including multiple banks of distributed-linked list memory according to an embodiment. The portion of a memory system includes a main memory 300, a link memory 303, and a context manager 314. The main memory 300 may be implemented using techniques described herein. The link memory is formed from an array of memory elements, such as memory banks 304a-d. For an embodiment, each memory bank 304a-d is a single port memory that provides a single access per clock cycle. As illustrated in FIG. 3, the embodiment includes a first memory bank 304a including locations 306a-d, a second memory bank 304b including locations 308a-d, a third memory bank 304c including locations 310a-d, and a fourth memory bank 304d including locations 312a-d.

As described above, the link memory is configured to store metadata including pointers to reference to the address of the location of data elements stored in the main memory. As a pointer to a location of main memory can be used, a direct relationship between the location of the main memory and the location of the link memory is not required. This provides the flexibility to use a separate and different architecture for the main memory and the link memory, such as the link memory having multiple banks of memory for every bank of main memory. The use of multiple banks of link memory provides the ability to use memory having a single access port and/or memory with lower clock speeds. As described above, the link memory is configured to store pointers used to interconnect entries to form a list of data elements stored in main memory using techniques including those described above. Further, the use of multiple banks of link memory provides an architecture that can scale to support higher capacity systems. For example, a memory system using multiple banks of link memory can be designed to handle at least K+1 memory accesses per clock cycle, where K is the number of data elements per clock cycle that can be stored in a main memory and 1 is the number of reads from main memory. Other examples of a memory system are configured to support more than 1 read from main memory per clock cycle using the techniques including those described herein.

As illustrated in FIG. 3, the embodiment also includes a context manager 314. Context manager 314 includes multiple tail and head entries. Specifically, the context manager 314 includes a first head entry 316 and a first tail entry 318 for the first bank of link memory 304a, a second head entry 320 and a second tail entry 322 for the second bank of link memory 304b, a third head entry 324 and a third tail entry 326 for the third bank of link memory 304c, and a fourth head entry 328 and a fourth tail entry 330 for the fourth bank of link memory 304d. Each set of tail and head entries maintains metadata for the first and last entry of a list, respectively, for each bank. That is, the first head entry 316 maintains metadata for the first entry stored in the first bank 304a and the first tail entry 318 maintains metadata for the last entry stored in the first bank 304a. The second head entry 320 maintains metadata for the first entry stored in the second bank 304b and the second tail entry 322 maintains metadata for the last entry of a list stored in the second bank 304b. The third head entry 324 maintains metadata for the first entry of a list stored in the third bank 304c and the third tail entry 326 maintains metadata for the last entry of the list stored in the third bank 304c. The fourth head entry 328 maintains metadata for the first entry of a list stored in the fourth bank 304d and the fourth tail entry 330 maintains metadata for the last entry of the list stored in the fourth bank 304d. Each head and tail entry is configured to store metadata including metadata described herein. Together the lists of each bank 304a-d are used to generate a complete list that interconnects the data elements stored in the main memory 300.

For an embodiment, a processor is configured to assign a data-element sequence identifier to each data element received on a port. The data-element sequence identifier is assigned to each data element to indicate the order in which each data element was received. The data-element sequence identifier is stored as metadata in the location of the link memory as described herein. In addition, the data-element sequence identifier is stored in a head entry and tail entry if the corresponding data element stored in the main memory is the head of a list in a bank or a tail of a list in a bank.

For an embodiment including multiple banks of link memory, such as the embodiment illustrated in FIG. 3, the memory system is configured to determine the next element in a list by comparing data-element sequence identifiers assigned to data packets. A memory system configured to determine the next element includes a processor configured to read the head entries 316, 320, 324, and 328 stored for each bank 304a-d in the link memory 303. The processor compares the data-element sequence identifiers stored in all of the head entries 316, 320, 324, and 328 to determine which of the data elements is next in a list. For an embodiment, the lowest data-element sequence identifier is a numerical value assigned such that the lowest numerical value can be used to determine the next data element in a list; however, the system is not limited to using the lowest data-element sequence identifier as an indicator. A data-element sequence identifier, according to an embodiment, is assigned to a data element upon arrival to the network device. Once the processor determines the next data element in the list, the processor is configured to retrieve the address of the main memory location 302*a-d* where the data element is stored. For an embodiment, a processor is configured to retrieve the address from the head entry 316, 320, 324, and 328 having the lowest data-element sequence identifier. A processor is further configured to use the retrieved address to read the data element out of main memory.

For an embodiment, a processor is configured to update the metadata of a data element read out of the main memory that is stored in the head entry. The processor is configured to use the address of the location in the link memory 303 that stores the next entry in the list for the bank 304*a-d*. A processor is also configured to update a tail entry 318, 322, 326, and 330 for a bank 304*a-d* when a new entry is added to the list for the bank 304*a-d* in response to a new data element being stored in the main memory 300.

As described above, a free entry manager is used to generate an available bank set for storing entries in the link memory. For an embodiment including multiple banks of memory, for example the embodiment illustrated in FIG. 3, the free entry manager is configured to generate an available bank set that includes one or more locations in each of the banks such that an access conflict will not occur. An access conflict would occur if a read or write access to a bank is required beyond the capabilities of a bank of the link memory. For example, a link memory including banks having a single access port would be limited to either one read or write per clock cycle. Thus, in an embodiment using banks with a single access port, a free entry manager would be configured to exclude locations of a bank scheduled for a read or write in a clock cycle from the available bank set.

According to an embodiment, a free entry manager is configured to generate an available bank set based on one or more of the following criteria including, but not limited to: 1) a location is not used by another data element; 2) a bank containing an entry to a list is not being accessed by a read operation; and 3) a bank containing a link entry is not accessed for linking operations. Linking operations include, but are not limited to write access to update metadata, read access to update a head or tail entry, write access to include metadata for a new entry to a list, access to invalidate an entry in a list, or other access to location in link memory. A free entry manager may also be configured to determine read/write access availability for banks including more than a single access port. A free entry manager is configured to determine the availability of a bank based on techniques known in the art including, but not limited to, a request bit/flag set, a request bus line activated, a scheduling protocol, or other indicator that access to a bank is scheduled or otherwise reserved.

Figure 4:
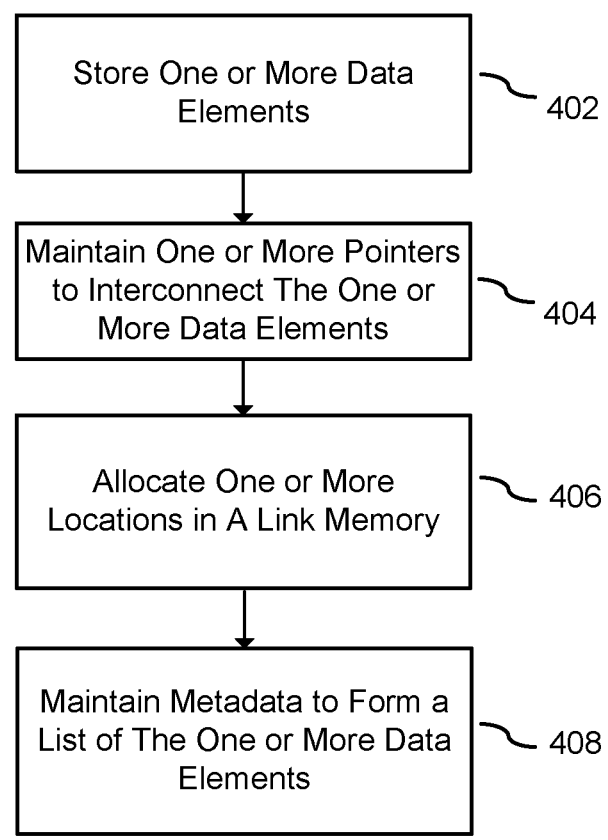
FIG. 4 illustrates a flow diagram for a method for implementing a distributed-linked list according to an embodiment.

FIG. 4 illustrates a flow diagram for a method for implementing a distributed-linked list according to an embodiment. The method includes storing one or more data elements 402. For example, storing one or more data elements in a main memory includes using techniques including those described herein. Further, the method includes maintaining one or more pointers to interconnect the one or more data elements 404. For example, maintaining one or more pointers to interconnect the one or more data elements includes storing and updating pointers and other metadata using techniques as described herein. The method also includes allocating one or more entries in a link memory 406. For example, allocating one or more entries in a link memory includes selecting a location from an available bank set of locations and setting a pointer to reference the address of that location using techniques including those described herein. Moreover, the method includes maintaining metadata to form a list of the one or more data elements 408. For example, maintaining metadata to form a list of the one or more data elements includes storing and updating head and tail entries using techniques including those described herein.

Figure 5:
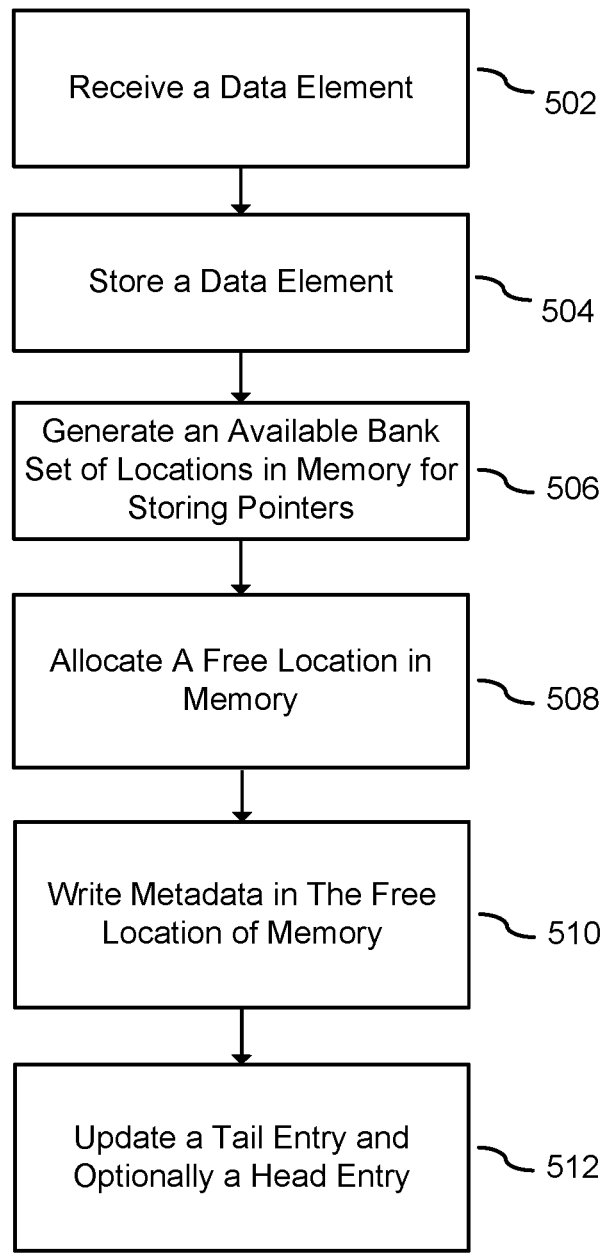
FIG. 5 illustrates a flow diagram for a method for storing a data element using a distributed-linked list according to an embodiment.

FIG. 5 illustrates a flow diagram for a method for storing a data element using a distributed-linked list according to an embodiment. The method includes receiving a data element 502. The method also includes storing a data element 504. Storing a data element includes using techniques including those described herein. Further, the method includes generating an available bank set of locations in memory for storing pointers 506. Generating an available bank set of locations for storing pointers includes using techniques including those described herein. The method also includes allocating a free location in memory 508. For example, allocating a free location in memory includes selecting a location from an available bank set of locations and setting a pointer to reference the address of that location. In addition, the method includes writing metadata in the free location in memory 510. Writing metadata in the free location in memory includes using techniques including those described herein. The method also includes updating a tail entry and optionally a head entry 512. For example, the method updates a head entry when a new list is created (enqueuing/linking) or the first entry in a list is read from memory (dequeuing/unlinking). The method updates a tail entry, for example, when a new entry is added to the list (enqueuing/linking), or the last entry is read from memory (dequeuing/unlinking). Updating a head entry and/or a tail entry includes using techniques including those described herein.

Figure 6:
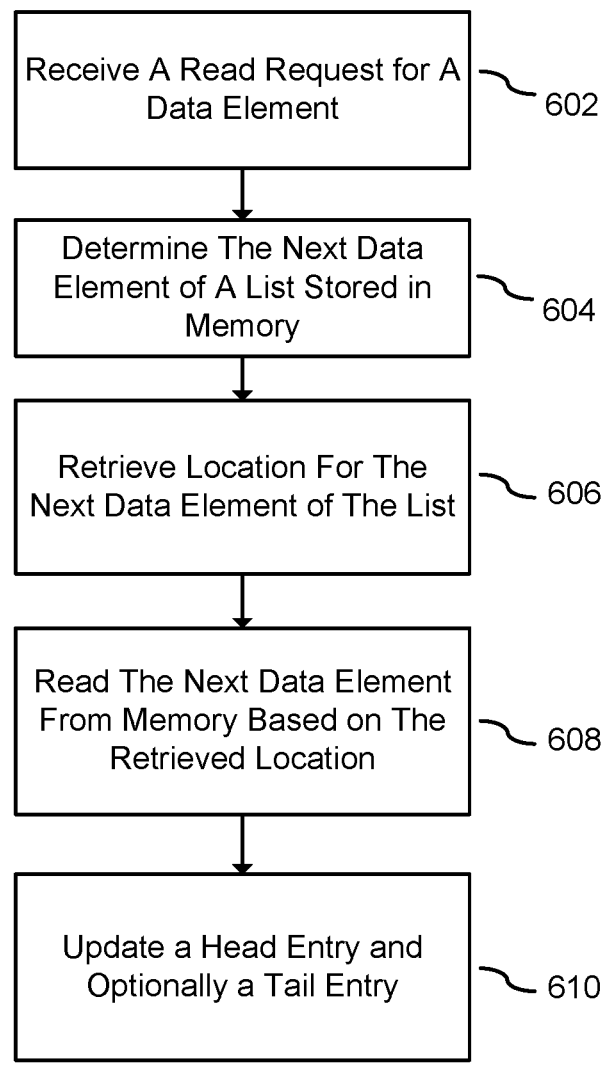
FIG. 6 illustrates a flow diagram for reading a data element using a distributed-linked list according to an embodiment.

FIG. 6 illustrates a flow diagram for reading a data element using a distributed-linked list according to an embodiment. The method includes receiving a read request for a data element 602. Further, the method includes determining the next data element of a list 604. For example, determining the next data element of a list includes using one or more head entries using techniques including those described herein. The method also includes retrieving the location for the next data element of the list 606. For example, retrieving the location for the next data element of the list includes reading the address of the location in memory of the next element from the head entry using techniques including those described herein. Moreover, the method includes reading the next data element from the memory based on the retrieved location 608. Reading the next data element from the memory based on the retrieved location includes using techniques such as those described herein. The method also includes updating a head entry and optionally updating a tail entry 610. For example, the method updates a head entry when a new list is created or the first entry in a list is read from memory. The method updates a tail entry, for example, when a new entry is added to the list, or the last entry is read from memory. Updating a head entry and/or a tail entry includes using techniques including those described herein.

Figure 7:
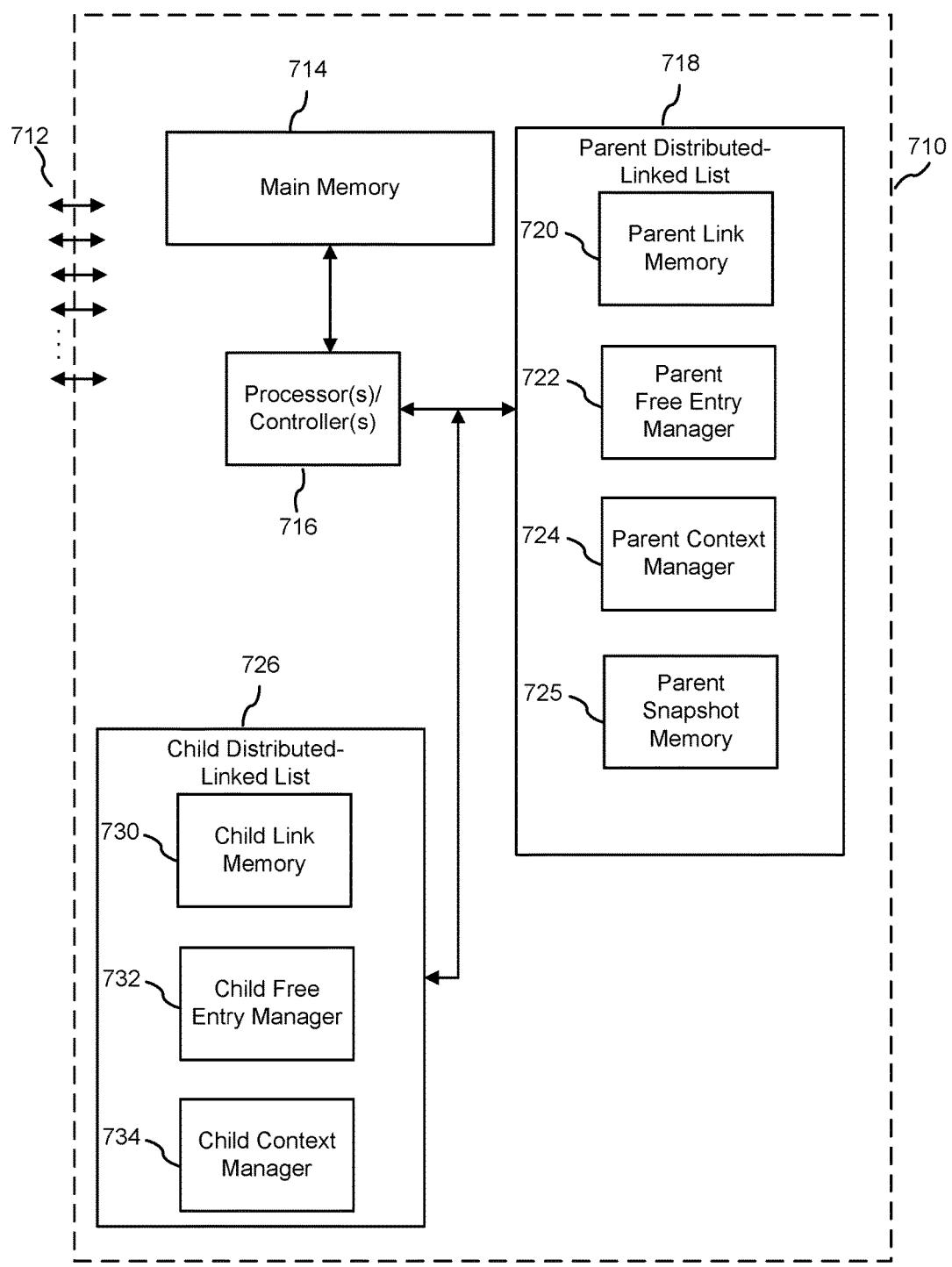
FIG. 7 illustrates a block diagram of a network device including a memory system implementing hierarchical distributed-linked list according to an embodiment.

FIG. 7 illustrates a block diagram of a network device including a memory system implementing a hierarchical distributed-linked list according to an embodiment. The memory system is configured to interconnect data elements by generating lists using techniques including those described herein. Further, the memory system implementing a hierarchical distributed-linked list is configured to generate one or more snapshots based on list metadata to maintain the lists of data elements. Maintaining list metadata includes generating, storing, and updating list metadata using techniques including those described herein. The memory system is configured to maintain linked-list metadata to interconnect a plurality of snapshots. For an embodiment, maintaining linked-list metadata includes generating, storing, and updating link-list metadata using techniques including those described herein.

For an embodiment, the memory system implementing a hierarchical distributed-linked list is configured to store multiple data packets split up into a plurality of cells, where each cell is then transmitted and received at a network device 710. The memory system is configured to receive cells of a data packet and to interconnect the cells of a data packet as the cells are received using a child distributed-linked list 726. The child distributed-linked list 726 is configured to generate a list of cells of a data packet using techniques describe herein with regard to implementing a distributed-linked list and generating lists of data elements. The list of cells generated by the child distributed-linked list 726 maintains the order of the cells of the data packet in the order the cells are received at a network device using a child link memory 730, a child free entry manager 732, and a child context manager 734. The child link memory 730 is configured to maintain metadata to interconnect data elements stored in the main memory 714 using techniques described herein with regard to implementing a link memory. The child free entry manager 732 is configured to generate a child available bank set of locations in the child link memory 730 using techniques including those described herein with regard to implementing a free entry manager. The child context manager 734 is configured to maintain list metadata including pointers that interconnect one or more data elements stored in the main memory 714 using techniques including those described herein with regard to implementing a free entry manager.

Further, a memory system implementing a hierarchical distributed-linked list, according to an embodiment, includes a parent distributed-linked list 718. The parent distributed-linked list 718 is configured to generate a snapshot based on a list of data elements generated by a child distributed-linked list 726. The parent distributed-linked list 718 is also configured to maintain linked-list metadata to interconnect multiple snapshots. By interconnecting snapshots, a parent distributed-linked list 718, for example, is configured to maintain the order of data packets in the order that the data packet is received at a network device, such as based on the order of the last cell received for a data packet. In addition, a parent distributed-linked list 718 is configured to form a queue of data packets by interconnecting snapshots. A queue may be formed based on destination address, network policies, traffic shaping, and/or other techniques including those known in the art for ordering data packets. Using a child distributed-linked list 726 to generate a list of cells for every data packet received and a parent distributed-liked list 718 to maintain linked-list metadata to generate snapshots to interconnect one or more lists of cells of a data packet, the memory system implementing a hierarchical distributed-linked list is configured to maintain the cells for each data packet received and to maintain the order of each data packet received such that each data packet can be retrieved from the memory system for egress based on the order received and/or the order the packet is placed in a queue.

Specifically, FIG. 7 illustrates a network device 710 including a plurality of input/output ports 712. Data packets are received and transmitted through the ports 712 using techniques including those known in the art. The ports 712 are coupled with a main memory 714. A main memory may include memory technologies including, but not limited to, dynamic random-access memory ("DRAM"), static random-access memory ("SRAM"), flash memory, and other technologies used to store data including those known in the art.

The main memory 714 is coupled with one or more processors 716. A processor 716 includes, but is not limited to, a central processing unit ("CPU"), a controller, an application-specific integrated circuit ("ASIC"), field-programmable gate arrays ("FPGA"), or other types of control units. The one or more processors 716 are configured to manage access to the main memory 714 using techniques including those known in the art. For example, the one or more processors 716 are configured to determine a location to store data received on one or more ports 712. The one or more processors 716 are also configured to read data stored in the main memory 714 when the data is to be transmitted on one or more ports 712. Further, the one or more processors 716 are configured to overwrite, update, and invalidate memory locations using techniques including those known in the art.

Further, the embodiment illustrated in FIG. 7 includes a parent distributed-linked list 718. The parent distributed-linked list 718 is coupled with one or more processors 716. Further, the parent distributed-linked list 718 includes a parent link memory 720, a parent free entry manager 722, a parent context manager 724, and parent snapshot memory 725. The parent link memory 720 is configured to maintain linked-list metadata to interconnect a plurality of snapshots generated based on list metadata used to interconnect data elements stored in the main memory 714. For example, the parent link memory 720 is configured to store linked-list metadata including one or more pointers that reference at least one snapshot stored in a parent snapshot memory 725. The parent link memory 720 may include one or more of the memory technologies as described herein. The parent link memory 720 includes a plurality of locations for storing information. Each of the plurality of locations has an address used to access data stored in the location. For an embodiment, parent link memory 720 includes a plurality of memory banks with each of the memory banks including a plurality of locations and each location having an address used to access data. A parent link memory 720 may also include a single memory bank.

A parent distributed-linked list 718, according the embodiment illustrated in FIG. 7, also includes a parent free entry manager 722. The free entry manager 722 is configured to generate a parent available bank set of locations in the parent link memory 720. The parent available bank set is a group of one or more addresses in the parent link memory 720 that are not in use or allocated for use. For an embodiment, the one or more addresses reside in different memory banks of the parent link memory 720. For example, the parent free entry manager 722 is configured to maintain a list of addresses for the locations in parent link memory 720 that are not used for storing or allocated for storing linked-list metadata for interconnecting snapshots currently stored in a parent snapshot memory 725 as a parent available bank set. For an embodiment, a parent free entry manager 722 uses one or more memory technologies including those known in the art for storing a parent available bank set. For an embodiment, the one or more processors 716 are configured to remove a parent link memory address from the parent free entry manager 722 when a link memory address is used or allocated to store linked-list metadata to interconnect snapshots stored in a parent context manager 724. Further, the one or more processors 716 are configured to add a parent link memory address to the parent free entry manager 722 after the link memory address is no longer in use or allocated. For example, once a data element or data packet associated with a snapshot is read from main memory 714, the one or more processors 716 are configured to deallocate or invalidate a location of parent link memory 720 associated with the snapshot, which includes writing the address of the location in the parent free entry manager 722.

According to the embodiment illustrated in FIG. 7, the parent distributed-linked list 718 includes a parent context manager 724. The parent context manager 724 is configured to maintain snapshot list metadata including one or more pointers that interconnect one or more snapshots stored in the parent snapshot memory 725 to generate a list of snapshots. Maintaining snapshot list metadata includes generating, storing, and updating snapshot list metadata using techniques including those described herein. The parent snapshot memory 725 includes one or more of the memory technologies as described herein. The list metadata associated with a list of data elements maintained in the parent snapshot memory 725 is a snapshot. For an embodiment, the parent context manager 724 maintains snapshot list metadata including a head address—the address in the parent snapshot memory 725 for the first entry in a list of snapshots—and a tail address—the address in the parent snapshot memory 725 for the last entry in the list of snapshots. Embodiments of a memory system that implement a hierarchical distributed-linked list as described herein provide the benefit of delinking the main memory from the link memory. The delinking provides the use of more efficient memory technologies and architecture including, but not limited to, using single port memory and using memory with lower clock rates. This provides the use of lower cost memory technologies and lower power consumption while meeting the needs of a high-speed, high-capacity network device.

For an embodiment, the memory system is configured to store list metadata maintained in the child context manager 734 as a snapshot in the parent snapshot memory 725 in response to receiving the last data element of a list. The memory system may also be configured to store list metadata maintained in the child context manager 734 as a snapshot in the parent snapshot memory 725 in response to receiving a data element of a second list. For example, if the child context manager 734 is currently storing list metadata for a first list of data elements, such as the data elements associated with a first data packet, and a data element is received at the network device for a second list of data elements, such as data elements associated with a second data packet, the memory system is configured to store the list metadata for the first list as a first snapshot in the parent snapshot memory 725. The memory system is configured to retrieve the first snapshot from the parent snapshot memory 725 and store the list metadata from child context manager 734 to update the list metadata for the first list.

The memory system is also configured to retrieve a snapshot from the parent snapshot memory 725 and store the list metadata of the snapshot in the child context manager 734 in response to a request to transmit a data element or data packet. The memory system is configured to update the linked-list metadata in the parent context manager 724 and the parent link memory 720 and deallocate a location in the parent snapshot memory in response to a request to transmit a data element or data packet, for example, upon storing the list metadata of the snapshot in the child context manager 734. For an embodiment, the processor(s)/controller(s) 716 are configured to retrieve a snapshot, store linked-list metadata, update linked-list metadata and other metadata using techniques including those known in the art.

Figure 8:
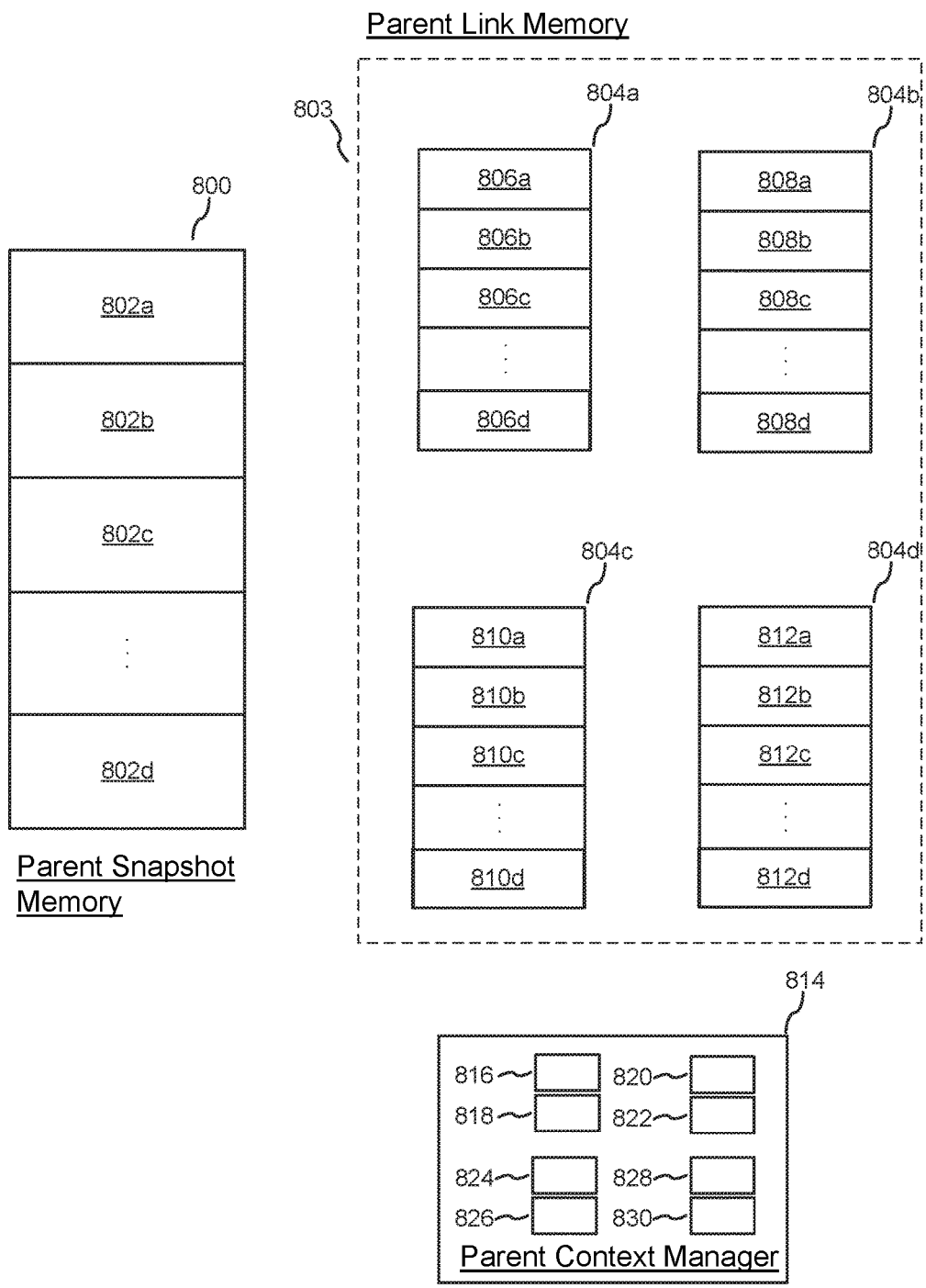
FIG. 8 illustrates a block diagram of a portion of a parent distributed-linked list including multiple banks of parent link memory according to an embodiment.

FIG. 8 illustrates a block diagram of a portion of a parent distributed-linked list including multiple banks of parent link memory according to an embodiment. The portion of the parent distributed-linked list includes a parent snapshot memory 800, a parent link memory 803, and a parent context manager 814. The parent snapshot memory 800 may be implemented using techniques described herein. The parent link memory 803 is formed from an array of memory elements, such as memory banks 804a-d. For an embodiment, each memory bank 804a-d is a single port memory that provides a single access per clock cycle. As illustrated in FIG. 8, the embodiment includes a first memory bank 804a including locations 806a-d, a second memory bank 804b including locations 808a-d, a third memory bank 804c including locations 810a-d, and a fourth memory bank 804d including locations 812a-d.

As illustrated in FIG. 8, the embodiment also includes a parent context manager 814. Parent context manager 814 includes multiple tail and head entries. Specifically, the parent context manager 814 includes a first head entry 816 and a first tail entry 818 for the first bank of parent link memory 804a, a second head entry 820 and a second tail entry 822 for the second bank of parent link memory 804b, a third head entry 824 and a third tail entry 826 for the third bank of parent link memory 804c, and a fourth head entry 828 and a fourth tail entry 830 for the fourth bank of parent link memory 804d. Each set of tail and head entries maintains snapshot list metadata for the first and last entry of a list of snapshots, respectively, for each bank of parent link memory 803. That is, the first head entry 816 maintains snapshot list metadata for the first entry stored in the first bank 804a and the first tail entry 818 maintains snapshot list metadata for the last entry stored in the first bank 804a. The second head entry 820 maintains snapshot list metadata for the first entry stored in the second bank 804b and the second tail entry 822 maintains snapshot list metadata for the last entry stored in the second bank 804b. The third head entry 824 maintains snapshot list metadata for the first entry of a list of snapshots stored in the third bank 804c and the third tail entry 826 maintains metadata for the last entry of the list of snapshots stored in the third bank 804c. The fourth head entry 828 maintains snapshot list metadata for the first entry of a list of snapshots stored in the fourth bank 804d and the fourth tail entry 830 maintains snapshot list metadata for the last entry of the list of snapshots stored in the fourth bank 804d. Each head and tail entry is configured to store snapshot list metadata including metadata described herein. Together the lists of snapshots of each bank 804a-d are used to generate a complete snapshot list that interconnects one or more of the snapshots stored in the parent snapshot memory 800.

For an embodiment, a processor is configured to assign a snapshot sequence identifier to each snapshot. The snapshot sequence identifier indicates the order in which each snapshot was received at the network device. For example, a snapshot sequence identifier is assigned upon arrival of the last data-element received for the snapshot. The snapshot sequence identifier is stored as linked-list metadata in the location of the parent link memory 803 as described herein. In addition, the snapshot sequence identifier is stored in a head entry and optionally tail entry if the corresponding snapshot stored in the parent snapshot memory 800 is the head of a list of snapshots in a bank or a tail of a list of snapshots in a bank.

For an embodiment including multiple banks of parent link memory 803, such as the embodiment illustrated in FIG. 8, the memory system is configured to determine the next snapshot in a list of snapshots by comparing snapshot sequence identifiers assigned to snapshots. A memory system configured to determine the next snapshot includes a processor configured to read the head entries 816, 820, 824, and 828 stored for each bank 804*a-d* in the parent context manager 814. The processor compares the snapshot sequence identifiers stored in all of the head entries 816, 820, 824, and 828 to determine which of the snapshots is next in a list of snapshots. For an embodiment, the lowest snapshot sequence identifier is a numerical value assigned such that the lowest numerical value can be used to determine the next data element in a list; however, the system is not limited to using the lowest snapshot sequence identifier as an indicator. A snapshot sequence identifier, according to an embodiment, is assigned to a data element upon arrival to the network device. Once the processor determines the next snapshot in the list, the processor is configured to retrieve the address of the parent snapshot memory 802*a-d* where the snapshot is stored. For an embodiment, a processor is configured to retrieve the address from the head entry 816, 820, 824, and 828 having the lowest snapshot sequence identifier. A processor is further configured to use the retrieved address to read the data element out of the parent snapshot memory 800 and store the snapshot in a child context manager using techniques including those described herein.

For an embodiment, a processor is configured to update the linked-list metadata of a snapshot read out of the parent snapshot memory 800 that is stored in the head entry of the parent context manager 814. The processor is configured to use the address of the location in the parent link memory 803 that stores the next entry in the list of snapshots for the bank 804*a-d*. A processor is also configured to update a tail entry 818, 822, 826, and 830 for a bank 804*a-d* when a new snapshot is added to the list of snapshots for the bank 804*a-d*, for example, in response to a new snapshot being stored in the parent context memory 800.

As described above, a parent free entry manager is used to generate a parent available bank set for storing entries in the parent link memory 803. For an embodiment including multiple banks of memory, for example the embodiment illustrated in FIG. 8, the parent free entry manager is configured to generate a parent available bank set that includes one or more locations in each of the banks such that an access conflict will not occur. An access conflict would occur if a read or write access to a bank is required beyond the capabilities of a bank of the parent link memory. For example, a parent link memory including banks having a single access port would be limited to either one read or write per clock cycle. Thus, in an embodiment using banks with a single access port, a parent free entry manager would be configured to exclude locations of a bank scheduled for a read or write in a clock cycle from the parent available bank set.

According to an embodiment, a parent free entry manager is configured to generate a parent available bank set based on one or more of the following criteria including, but not limited to: 1) a location is not used by another data element; 2) a bank containing an entry to a list is not being accessed by a read operation; and 3) a bank containing a link entry is not accessed for linking operations. Linking operations include, but are not limited to write access to update linked-list metadata, read access to update a head or tail entry, write access to include linked-list metadata for a new entry to a list, access to invalidate an entry in a list of snapshots, or other access to location in parent link memory. A parent free entry manager may also be configured to determine read/write access availability for banks including more than a single access port. A parent free entry manager is configured to determine the availability of a bank based on techniques known in the art including, but not limited to, a request bit/flag set, a request bus line activated, a scheduling protocol, or other indicator that access to a bank is scheduled or otherwise reserved.

Figure 9:
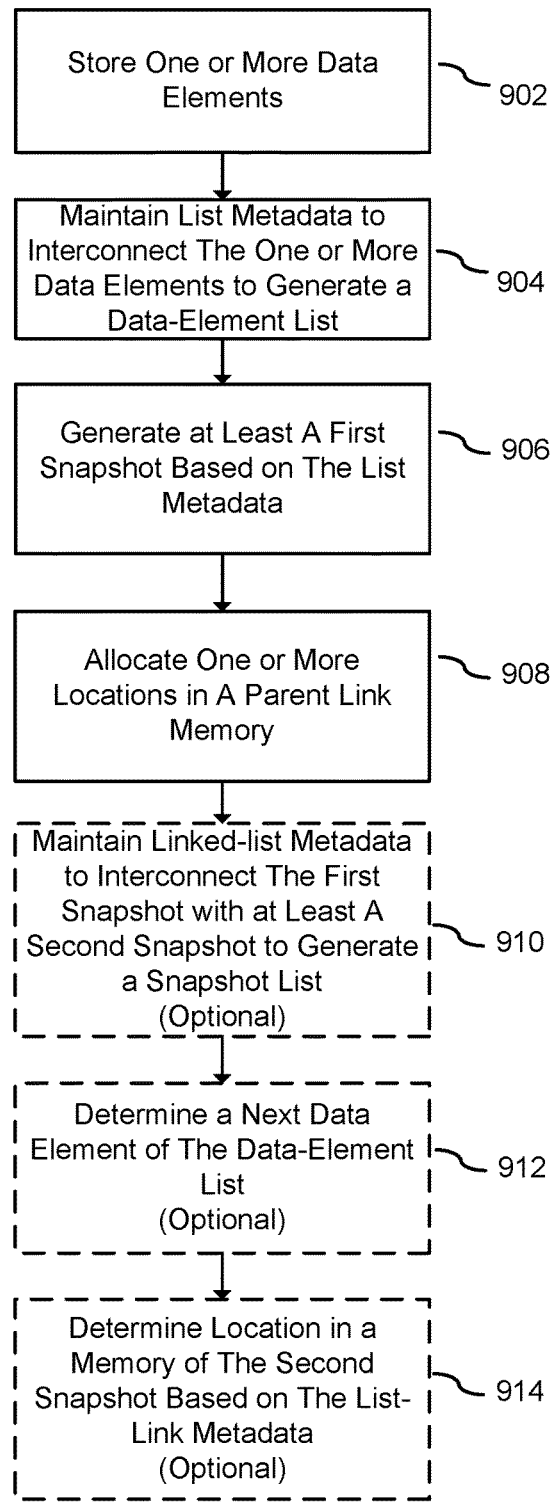
FIG. 9 illustrates a flow diagram for a method for implementing a hierarchical distributed-linked list according to an embodiment.

FIG. 9 illustrates a flow diagram for a method for implementing a hierarchical distributed-linked list according to an embodiment. The method includes storing one or more data elements (902) using techniques including those described herein. The method also includes maintaining list metadata to interconnect the one or more data elements (904) using techniques including those described herein. Further, the method includes generating at least a first snapshot based on the list metadata (906) using techniques including those described herein. The method includes allocating one or more locations in a memory (908) using techniques including those described herein. In addition, the method optionally includes maintaining linked-list metadata to interconnect the first snapshot with at least a second snapshot (910) using techniques including those described herein. Moreover, the method optionally includes determining a next data element of said data-element list based on said list metadata (912) using techniques including those described herein. The method optionally includes determining a location in a memory of the second snapshot based on said linked-list metadata 914.

For an embodiment, a memory system as described herein is configured to generate a data element list using one or more skip lists. Data element lists using one or more skip list can overcome read rate limitations inherent in traversing hardware based data element lists. An example read rate limitation is a result of latency between a read request for a data element and the availability of the data element. Further, the efficiency gained by using data element lists including one or more skip lists provides the benefit of using lower cost memory having fewer access ports, for example a single access port memory. For example, banked memory structures of a distributed linked list may include skip lists. These skip lists may be used to enable higher read rates to overcome read rate limitations associated with the hardware.

For an embodiment, a data element list is generated to include K number of skip lists. Each of the first K nodes in the data element list is the head of the K skip list. Each skip list contains a subsequence of data elements that form the complete data element list. For an embodiment, a system is configured to generate a distance between two subsequent elements in a skip list to overcome a read response latency based on the hardware design of a memory system. As an example read rate limitation, consider a memory system having a read rate limitation of three clock cycles, the memory system is configured to generate a data element list such that the second element of the first skip list in the data element list is after the third element in the data element list. Generating a data element list based on a skip list structure, such as those described herein, enables fast access to the first K elements in a data element list to overcome the latency between read accesses as a result of traversing hardware lists.

Figure 10:
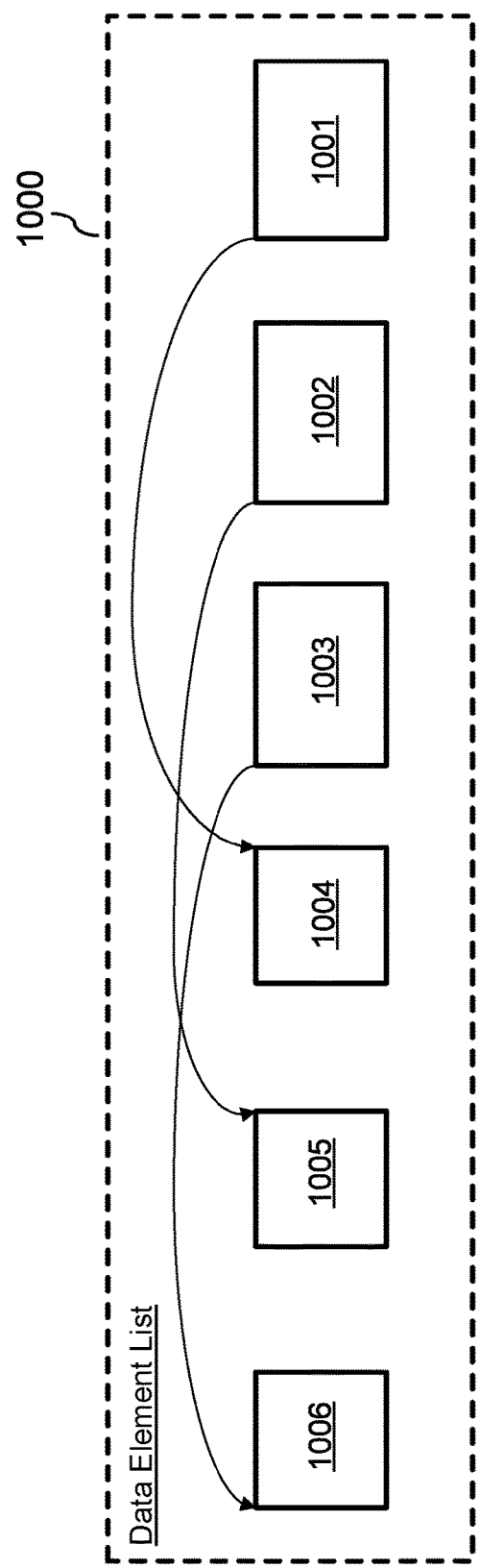
FIG. 10 illustrates a block diagram of an exemplary data element list using skip lists generated by a system according to an embodiment.

FIG. 10 illustrates a block diagram of an exemplary data element list using skip lists generated by a system according to an embodiment. The data element list 1000, according to this example, includes three skip lists. Each skip list includes a head node. In FIG. 10, the head nodes are labeled 1001, 1002, and 1003. Each head node in the data list includes a link, such as a pointer as described herein, to the next element in the skip list. As described herein, the location of the next element in a skip list within the data element list is based in part on the number of skip lists in a data element list. The number of skip lists in a data element list may also be based on a desired read rate of data elements for the system. In the example illustrated in FIG. 10, the first skip list having the head node 1001 is linked to the second node of the first skip list 1004. The second skip list having the head node 1002, the second node in the data element list, is linked to the second node of the second skip list 1005. The third skip list having a head node 1003 is linked to the second node of the third skip list 1006.

Figure 11:
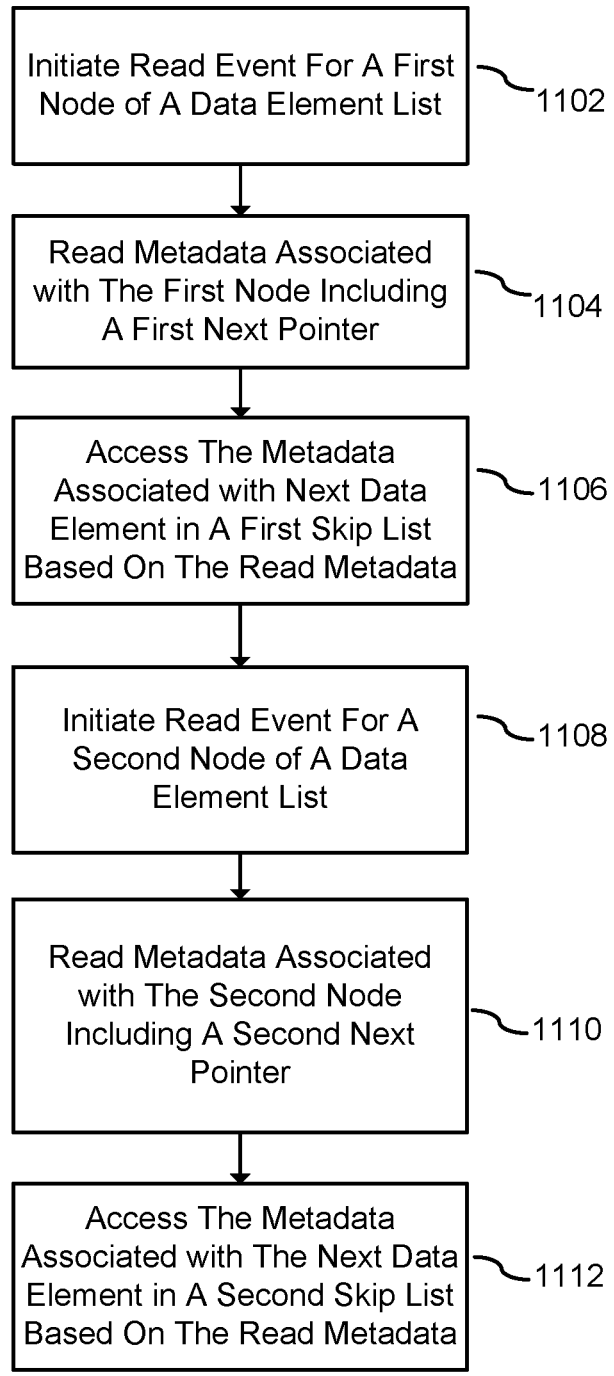
FIG. 11 illustrates an exemplary timeline for read accesses using skip lists according to an embodiment.

FIG. 11 illustrates a block diagram of an exemplary method for read accesses using skip lists according to an embodiment to access the data elements of the data element list. The example described below assumes that the latency between a read request for a data element and the availability of the data element is three clock cycles. However, one skilled in the art would understand that different arrangements of skip lists could be used to address any amount of latency. The system initiates the read event to read a first node of a data element list (1102). For example, the system initiates, at a time zero, a read event to read the head node of the first skip list 1001 from the data element list 1000, as illustrated in FIG. 10, by issuing the read request for the head node of the first skip list 1001, the first node in the data element list and the head node of the first skip list in the data element list, using techniques including those described herein. As described above a memory system, for example, determines the first node in the data element list by reading head entries using techniques described herein. The metadata associated with the first data element in the data element list is read (1104), which according to an embodiment, includes the address in a main memory where the first data element is stored and a pointer for the next node in the skip list. For the example illustrated in FIG. 10, the next node in the skip list after the head node of the first skip list 1001 is determined to be the second node of the first skip list 1004 based on the metadata read. The system now having the pointer for the next node in the skip list can now operate in parallel to access the metadata associated with the next data element in the first skip list based on the read metadata (1106). For example, referring to FIG. 10, the metadata associated with the head node of the first skip list 1001 is used to access the metadata associated with the second node of the first skip list 1004 so that the metadata for the second node of the first skip list 1004 is available at a time 3.

The method includes initiating a read event for a second node of a data element list (1108). For example, with reference to FIG. 10, at a time 1, the system initiates a read event to read the head node of the second skip list 1002 from the data element list 1000 by issuing the read request for the head node of the second skip list 1002, which is the second node in the data element list 1000, using techniques including those described herein. As described above a system, for example, determines the second node in the data element list by reading head entries using techniques described herein.

Once the second node is determined, the metadata associated with the second data element of the data element list is read (1110), which according to an embodiment, includes the address in a main memory where the second data element is stored and a pointer for the next node in the skip list. Continuing with the example as illustrated in FIG. 10, the system determines the second node of the second skip list 1005 by reading the metadata associated with the head node of the second skip list 1002. Further, the method includes accessing the metadata associated with the next data element in a second skip list based on the read metadata (1112). For example, using the example in FIG. 10, the system uses the pointer that references the second node of the second skip list 1005 and can now operate in parallel to access the metadata associated with the second node of the second skip list 1005 so that the metadata will be available at a time 4.

Continuing with the example with reference to FIG. 10, at a time 2, the system initiates the read event to read the third node, the head node of the third skip list 1003, from the data element list 1000 by issuing the read request for the head node of the third skip list 1003, using techniques including those described herein. For example, as described above a memory system determines the third node in the data element list by reading head entries using techniques described herein. Once the third node is determined to be the head node of the third skip list 1003, the metadata associated with the head node of the third skip list 1003 is read, which according to an embodiment, includes the address in a main memory where the third data element is stored and a pointer for the next node in the skip list. As illustrated in FIG. 10, the next node in the skip list is the second node of the third skip list 1006. The system now having the pointer for the next node in the skip list can now operate in parallel to access the metadata associated with data element so that the metadata associated with data element will be available at time 5.

Figure 12:
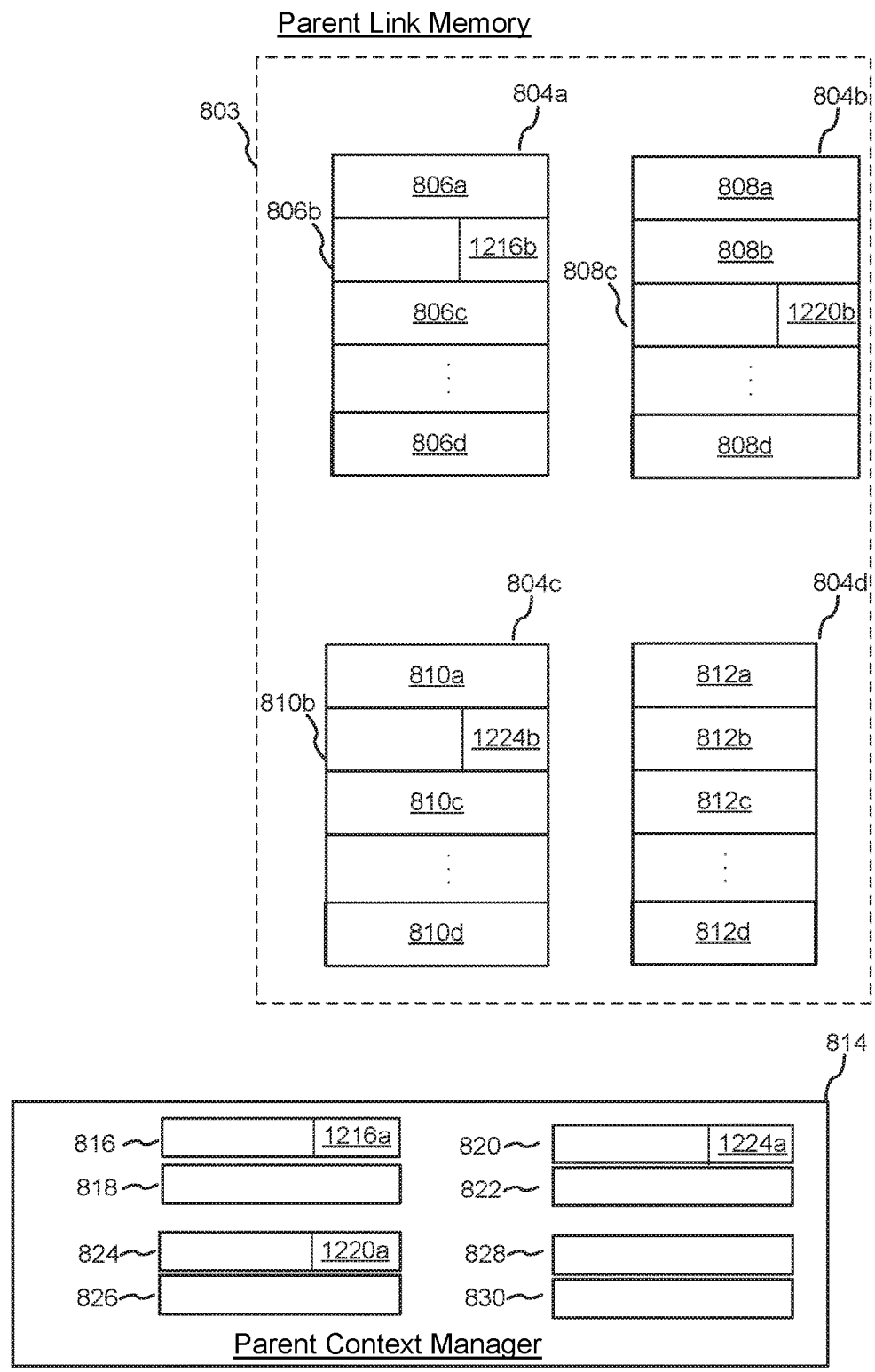
FIG. 12 illustrates a block diagram of a link memory and a context manager configured to store the data element list illustrated in FIG. 10 according to an embodiment.

At a time 3, the metadata associated with the second node of the first skip list 1004 in the data element list 1000 is available based on the initiation of the read access at time 0 by reading the pointer. At time 4, the metadata associated with the second node of the second skip list 1005 in the data element list 1000 is available based on the initiation of the read access at time 1 by reading the pointer. The method would continue the process described above until the last node in the data element list is read. FIG. 12 illustrates a block diagram of a link memory and a context manager configured to store the data element list illustrated in FIG. 10 according to an embodiment.

For an embodiment, a memory system configured to generate a data element list that includes one or more skip lists includes a memory system including multiple banks of distributed-linked list memory, including those described herein. The link memory is configured to contain data element link nodes associated with the data element list using techniques including those described herein. For an embodiment, each bank of the link memory is associated with a skip list of the data element list. Each entry in the link memory, according to an embodiment, includes metadata including a pointer providing the address of the location of data elements stored in the main memory, a next pointer to reference to the address in the link memory which includes the metadata for the next element in the skip list, and a sequence identifier. For another embodiment, each entry in the link memory is associated with a buffer memory entry assignment. Such an embodiment provides storage for metadata such as a next pointer for the next element in the skip list. This provides the benefit of requiring a smaller memory allocation for each entry of a link memory while maintaining the metadata to implement a data element list including skip lists. For an embodiment, an entry in the link memory includes other associated data including metadata as described herein. Moreover, the memory system includes a context manager configured to maintain multiple tail and head entries using techniques including those described herein. For an embodiment, the context manager includes a head entry and tail entry for each bank associated with a skip list.

Figure 13:
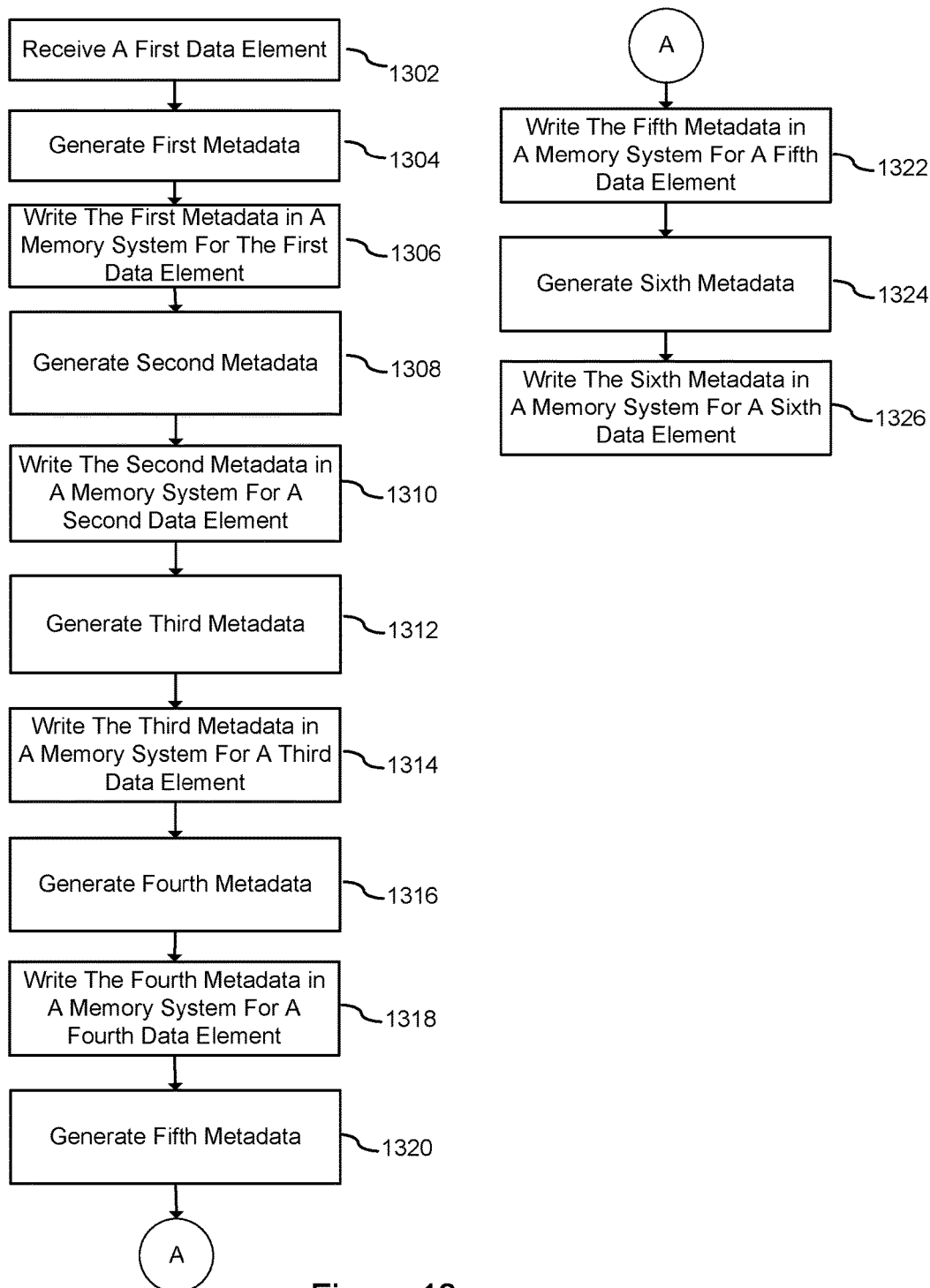
FIG. 13 illustrates a flow diagram for a method for implementing the method of generating a data element list including one or more skip lists and the associated metadata according to an embodiment.
Figure 14A:
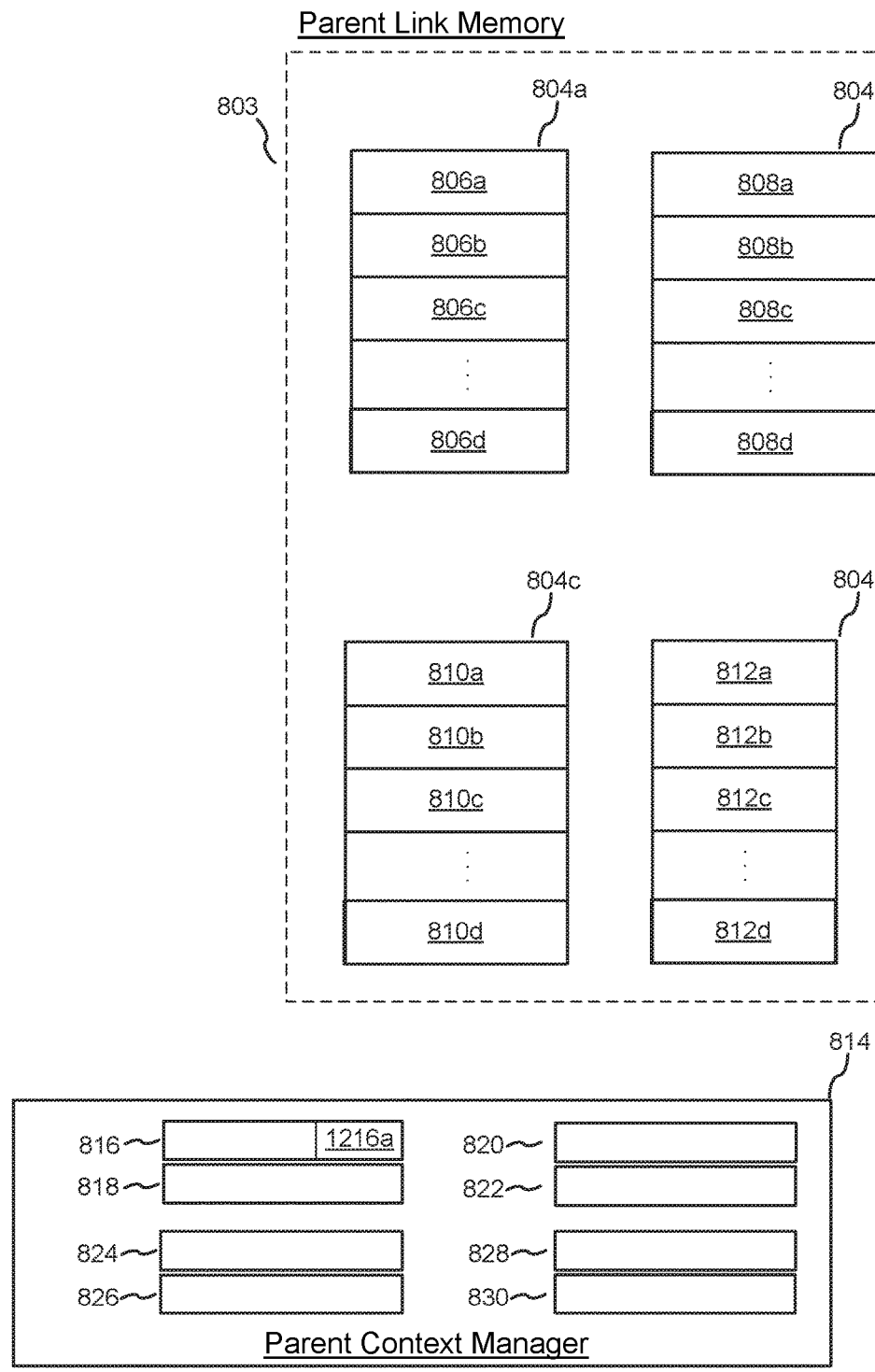
FIG. 14a-f illustrate block diagrams representing the method of generating a data element list including one or more skip lists and the associated metadata according to an embodiment.

FIG. 13 illustrates a flow diagram for a method for implementing the method of generating a data element list including one or more skip lists and the associated metadata according to an embodiment. FIGS. 14a-f illustrate block diagrams representing the state of a portion of a parent distributed-linked list including multiple banks during the method as illustrated in FIG. 13. For an embodiment, a method to generate a data element list including one or more skip lists includes receiving a first data element 1302 as illustrated in FIG. 13. The method includes generating a first metadata including a next pointer to reference to the address in the link memory for the metadata of the next element in the skip list 1304 and writing the first metadata in a memory system to form the first node of the data element list 1306 using techniques including those described herein. For example, as illustrated in FIG. 14a, the generated first metadata 1216a is written to a first head entry 816.

Figure 14B:
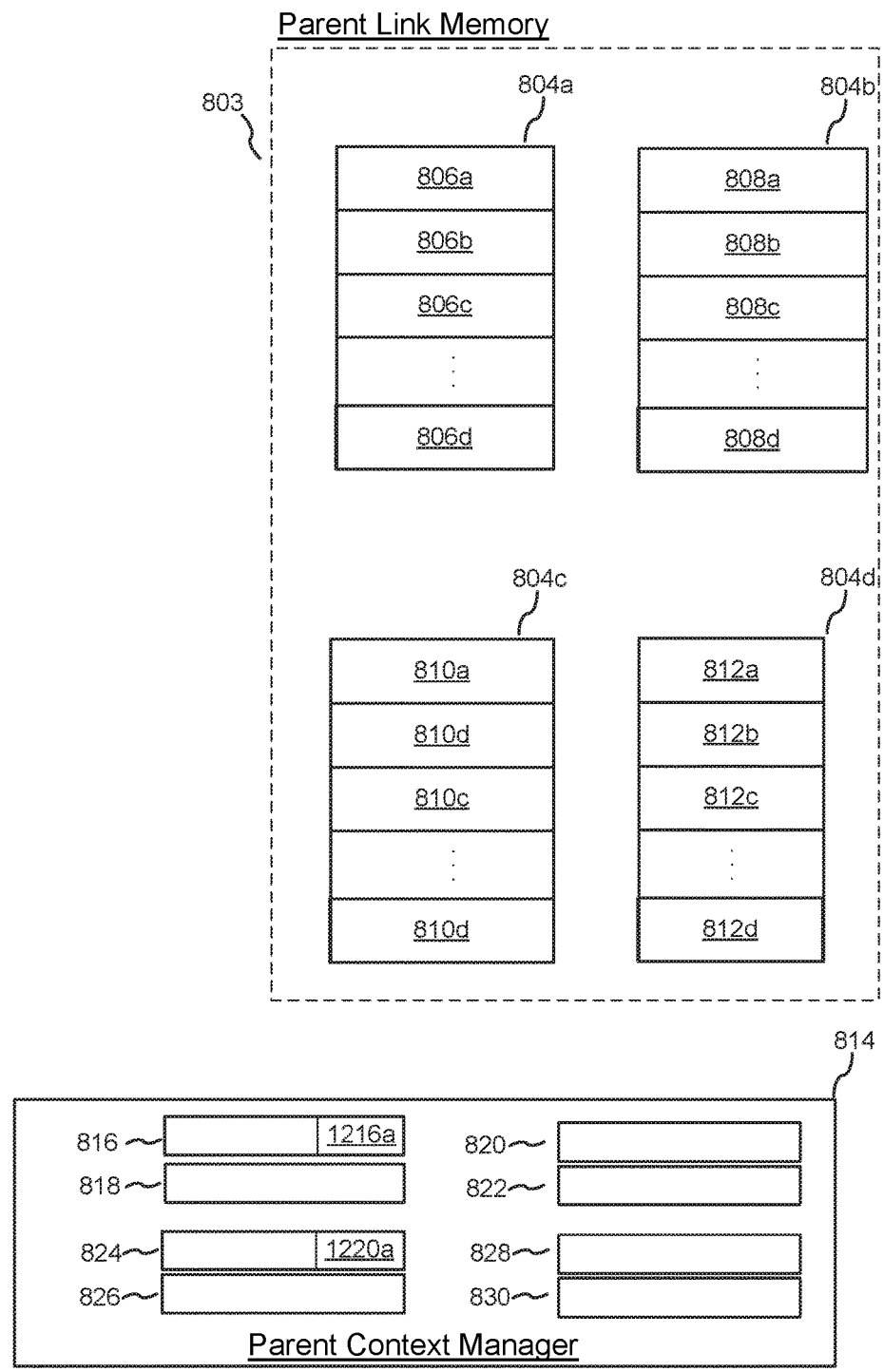

As illustrated in FIG. 13, the method includes generating second metadata including a next pointer to reference to the address in the link memory for the metadata of the next element in the second skip list 1308 and writing the second metadata in a memory system for a second data element 1310 that arrives at a network device using techniques including those described herein to form a second node of the data element list, which is the second node of the data element list and the head node of a second skip list. The second metadata, for example, is generated in response to receiving a second data element. For example, as illustrated in FIG. 14b, the generated second metadata 1220a is written to a second head entry 824.

Figure 14C:
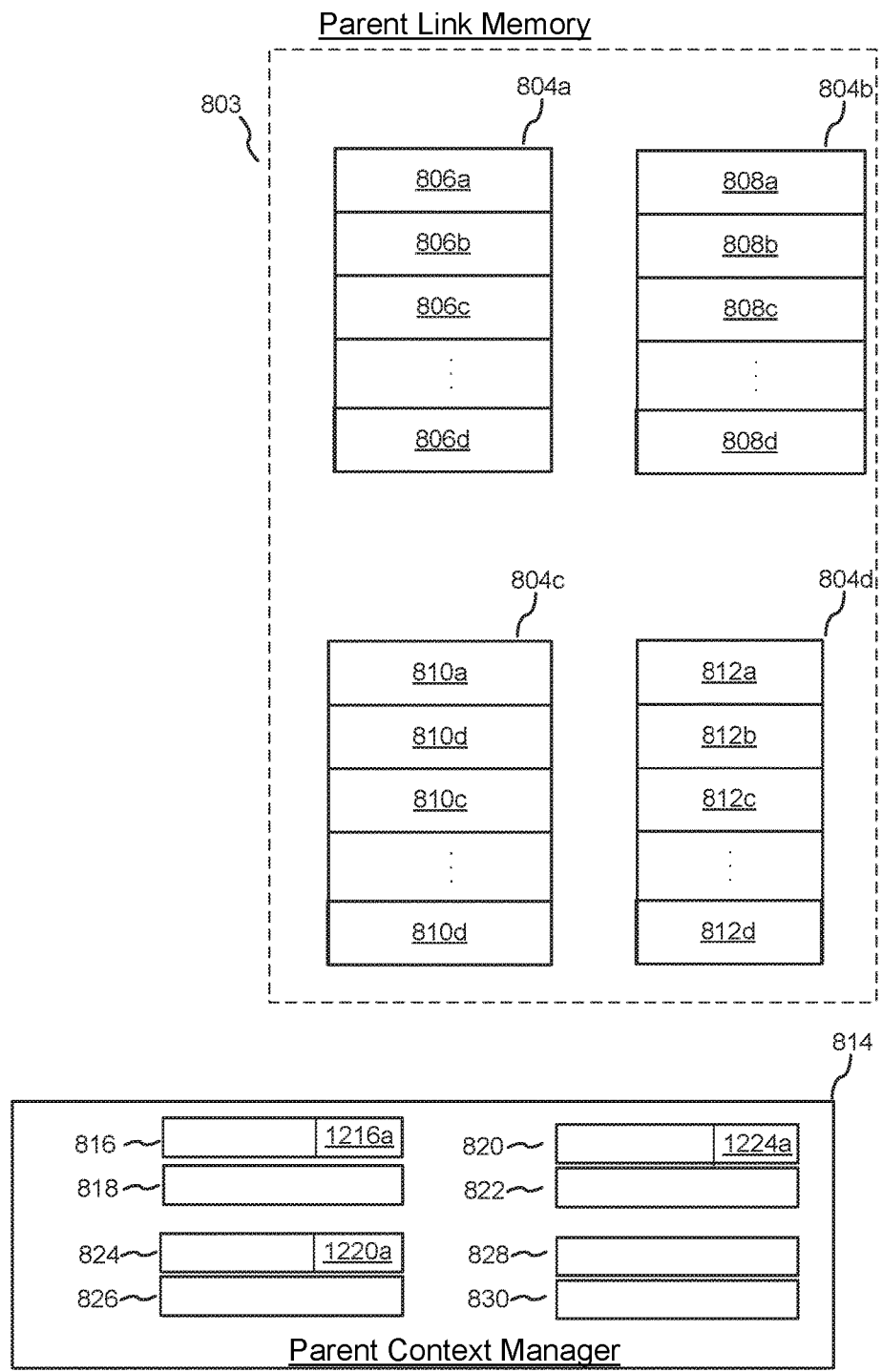
Figure 14D:
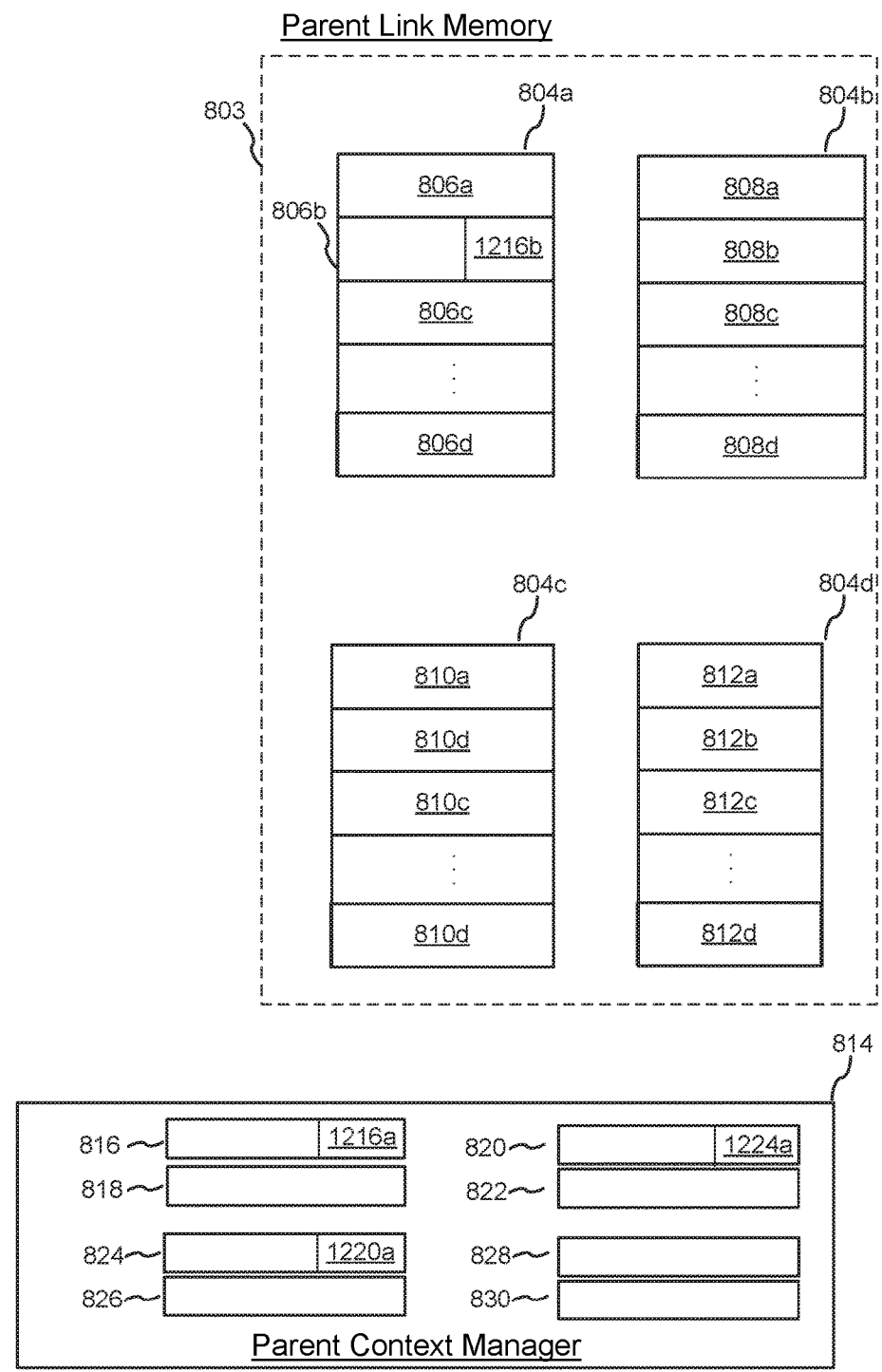

The method also includes generating third metadata including a next pointer to reference to the address in the link memory for the metadata of the next element in the third skip list 1312 and writing the third metadata in a memory system for a third data element 1314 that arrives at a network device using techniques including those described herein to form a third node of the data element list, which is the head node of the third skip list. For example, as illustrated in FIG. 14c, the generated third metadata 1224a is written to a third head entry 820. Further, the method includes generating fourth metadata including a next pointer to reference to the address in the link memory for the metadata of the next element in the first skip list 1316 and writing the metadata in a memory system for a fourth data element 1318 that arrives at a network device using techniques including those described herein to form a fourth node of the data element list, which is the second node of the first skip list. For example, as illustrated in FIG. 14d, the generated fourth metadata 1216b is written to a location 806b in a first memory bank.

Figure 14E:
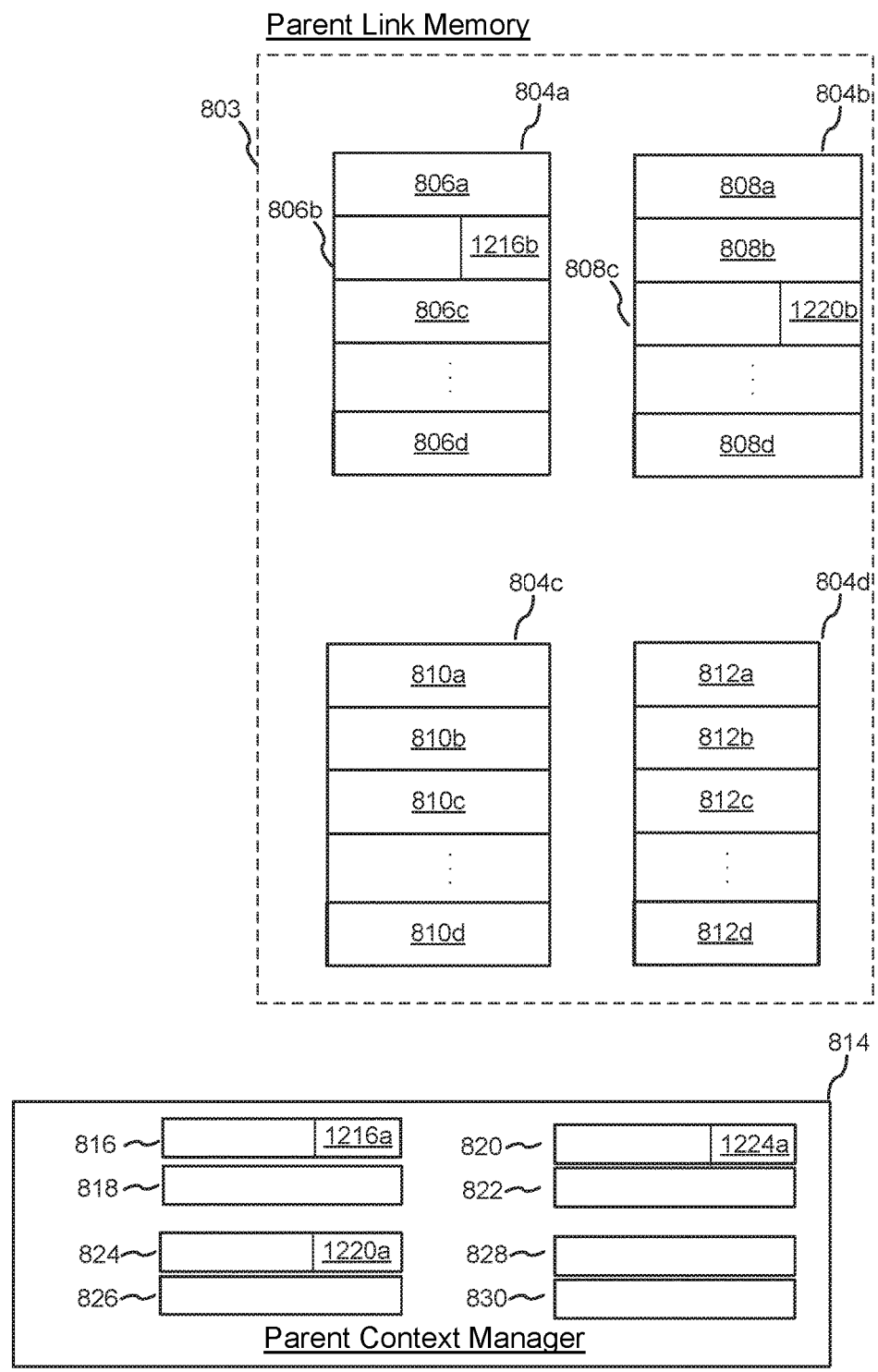
Figure 14F:
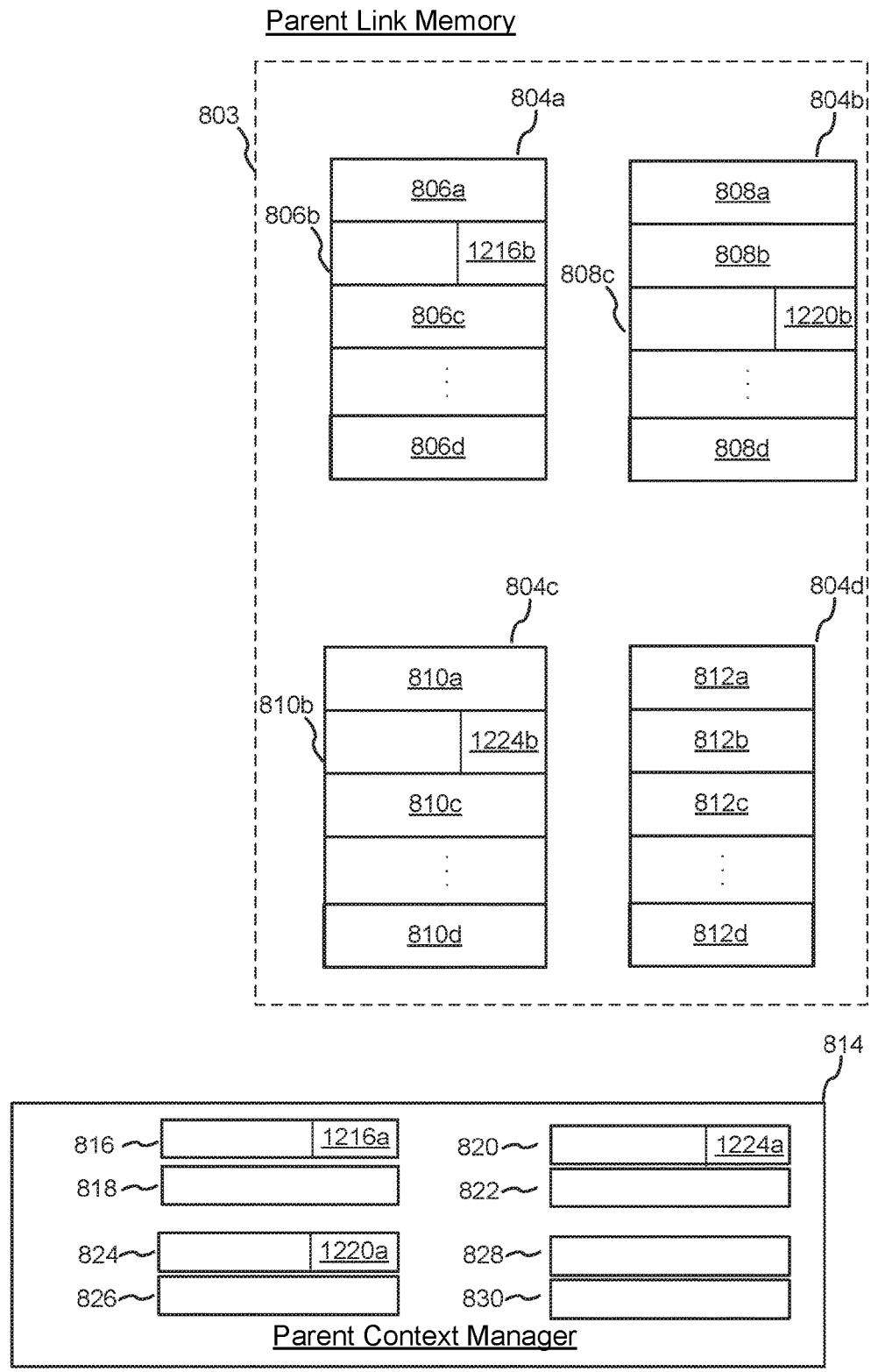

Moreover, the method includes generating fifth metadata including a next pointer to reference to the address in the link memory for the metadata of the next element in the second skip list 1320 and writing the metadata in a memory system for a fifth data element 1322 that arrives at a network device using techniques including those described herein to form a fifth node of the data element list, which is the second node of the second skip list. For example, as illustrated in FIG. 14e, the generated fifth metadata 1220b is written to a location 808c in a second memory bank. The method includes generating sixth metadata including a next pointer to reference to the address in the link memory for the metadata of the next element in the third skip list 1324 and writing the metadata in a memory system for a sixth data element 1326 that arrives at a network device using techniques including those described herein to form a sixth node of the data element list, which is the second node of the third skip list. For example, as illustrated in FIG. 14f, the generated sixth metadata 1224b is written to a location 810b in a third memory bank.

For a memory system configured to generate a data element list including one or more skip lists, each skip list in a data element list behaves as a single data element list. For example, the order of reads is determined by comparing the sequence identifiers that is stored in head entries of each skip list using techniques including those described herein. Such a memory system is configured to ensure access conflicts are not encountered by implementing access constraints. Further, a memory system is configured to restrict writes to memory banks of a link memory during clock cycles that a read access is scheduled. Moreover, to minimize access conflicts, a memory system is configured to have a number of memory banks in a link memory based on a desired read rate.

Figure 15:
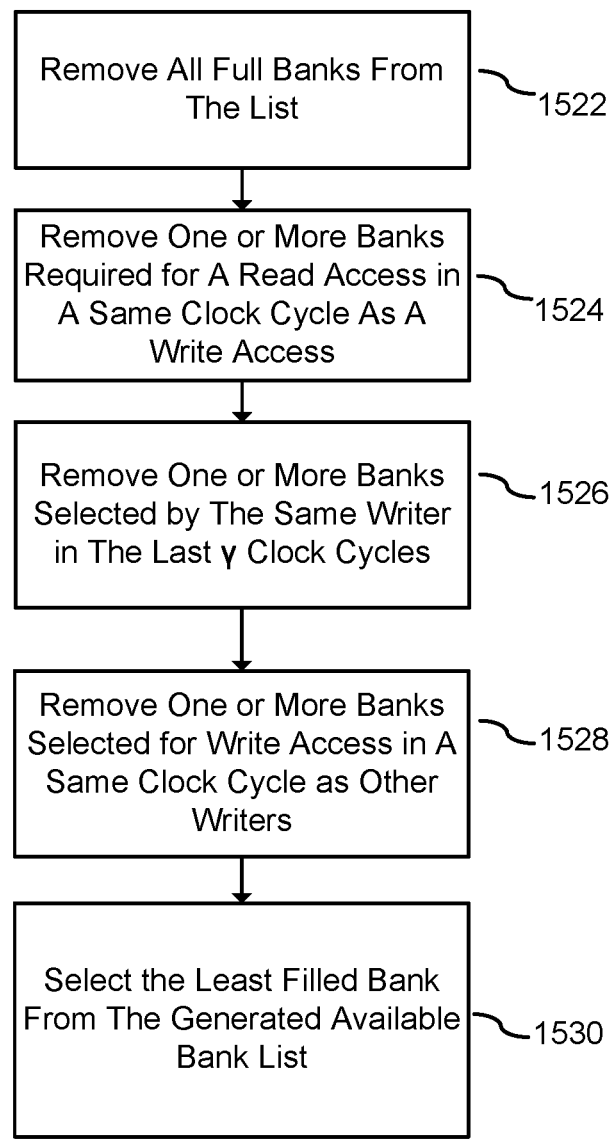
FIG. 15 illustrates a flow diagram for generating an available bank list in a link memory according to an embodiment.

A method for implementing a write for a memory system configured to generate a data element list including one or more skip lists includes generating an available bank list in a link memory. FIG. 15 illustrates a flow diagram for generating an available bank list in a link memory according to an embodiment. Generating an available bank list, potentially for each writer/source, may include one or more of removing all full banks from the list 1522; removing the one or more banks required for read access in the same clock cycle as the write access 1524; removing one or more banks that were selected by the same writer in the last $\gamma$ clock cycles 1526, where $\gamma$ is determined based on a desired read rate of the memory system; and removing the one or more banks selected for write access in the same clock cycle as other writers 1528. Further, the method includes selecting the least filled bank from the generated available bank list 1530.

For an embodiment, a memory system is configured to implement a hierarchical distributed-linked list based on data element lists that include one or more snapshot skip lists. The memory system is configured to interconnect data elements by generating data element lists using techniques including those described herein. Further, the memory system is configured to implement a hierarchical distributed-linked list by generating one or more snapshots based on list metadata to maintain the lists of data elements that include one or more skip lists using techniques including those described herein. Further, the memory system is configured to maintain linked-list metadata to interconnect a plurality of snapshots using techniques including those described herein.

By interconnecting snapshots, the memory system, for example, is configured to maintain the order of data packets in the order that the data packet is received at a network device, such as based on the order of the last cell received for a data packet. In addition, the memory system is configured to form a queue of data packets by interconnecting snapshots based on a data element list that includes one or more skip lists. A queue may be formed based on a destination address, network policies, traffic shaping, and/or other techniques including those known in the art for ordering data packets. Using techniques described herein, the memory system is configured to maintain linked-list metadata to generate snapshots to interconnect one or more lists of cells of a data packet. Further, the memory system implementing a hierarchical distributed-linked list is configured to maintain the cells for each data packet received and to maintain the order of each data packet received such that each data packet can be retrieved from the memory system for egress based on the order received and/or the order the packet is placed in a queue. Moreover, the interconnected snapshots generated from data element lists including skip lists can be used to provide high read rates at a given operating frequency.

For an embodiment, the memory system is configured to generate interconnected snapshots (data element set list) that include one or more snapshot skip lists such that each snapshot (date element set) that are included in the interconnected snapshots has an associated snapshot list node in the interconnected snapshots. The snapshot list node includes snapshot list metadata for the snapshot it is associated with. The snapshot list metadata, for an embodiment, includes a head address—the address in a memory for the first data element in the snapshot; a tail address—the address in the memory for the last data element in the snapshot; and a next snapshot pointer. The next snapshot pointer, includes a link or a pointer as described herein, to the next snapshot in the snapshot skip list. As described herein, the location of the next element in a snapshot skip list within the interconnected snapshots depends on the number of snapshot skip lists in the interconnected snapshots. The number of snapshot skip lists in an interconnected snapshots list may be based on a desired read rate of data elements for the memory system.

Figure 16:
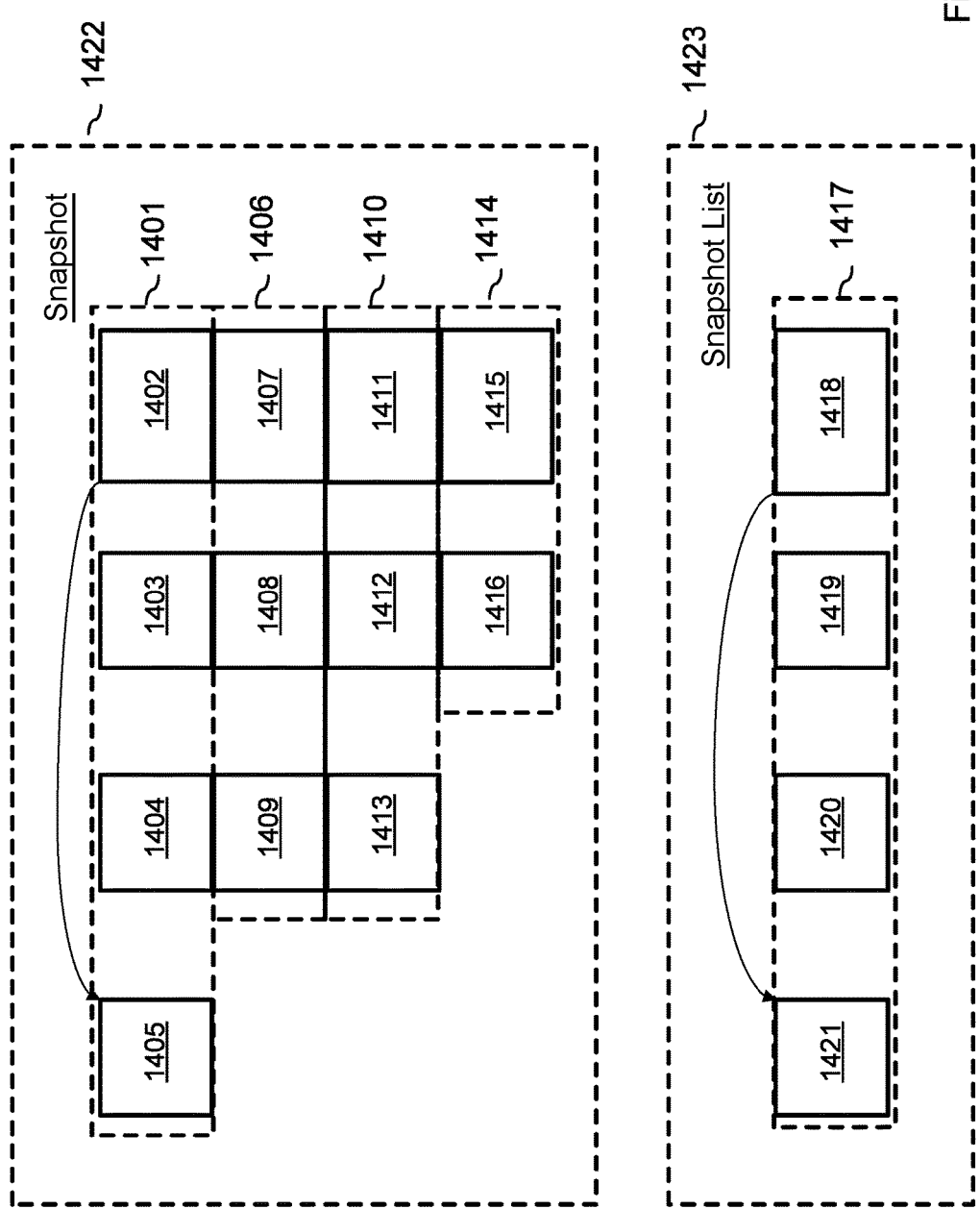
FIG. 16 illustrates an interconnected snapshot list generated by a memory system according to an embodiment.

FIG. 16 illustrates an interconnected snapshot list (data element set list—1423) generated by a memory system according to an embodiment. The interconnected snapshot list includes four snapshot list nodes (1418, 1419, 1420, 1421) that are associated with 4 variable length snapshots (1401, 1406, 1410, 1414). The four snapshot list nodes (1418, 1419, 1420, 1421) include three snapshot skip lists, two of which include a single node. The snapshot skip list includes the first snapshot list node 1418 and the fourth snapshot list node 1421. The first snapshot list node includes snapshot list metadata for snapshot 1401, such as snapshot list metadata described herein, and a next snapshot pointer to the subsequent snapshot list node in the snapshot skip list, 1421. The second snapshot list node 1419, such as snapshot list metadata described herein. The third snapshot list node 1420, such as snapshot list metadata described herein.

For an embodiment, a memory system configured to implement a hierarchical distributed-linked list from data element lists that include one or more snapshot skip lists includes a child distributed-linked list, a parent distributed-linked list, and a main memory. The child distributed-linked list includes multiple memory banks and is configured to generate a list of data elements to generate a data element list including one or more skip lists using techniques described herein. The parent distributed-linked list is configured to generate a snapshot based on a data element list generated by a child distributed-linked list using techniques described herein. The parent distributed-linked list is also configured to maintain linked-list metadata to interconnect multiple snapshots to generate an interconnected snapshot list including one or more snapshot skip lists using techniques described herein. By interconnecting snapshots, a parent distributed-linked list, for example, is configured to maintain the order of data elements in the order that the data element is received at a network device, such as based on the order of the last cell received for a data packet. In addition, a parent distributed-linked list is configured to form a queue of data packets by interconnecting snapshots.

Figure 17:
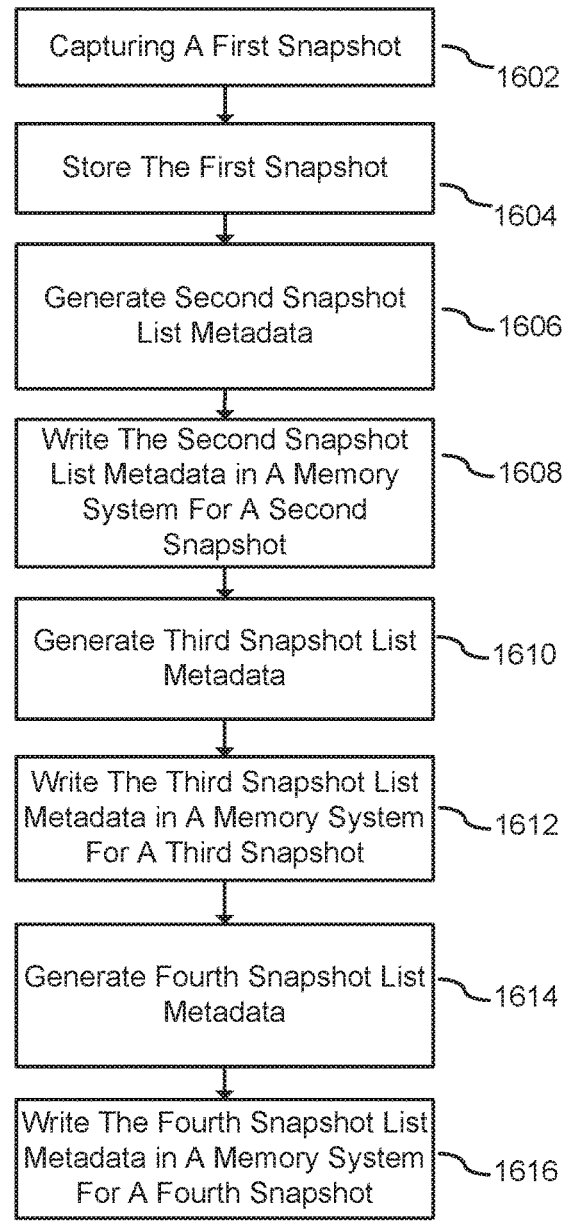
FIG. 17 illustrates a flow diagram for a method of generating an interconnected snapshot list including one or more data element set lists including one or more skip lists and the associated snapshot list metadata according to an embodiment.
Figure 18A:
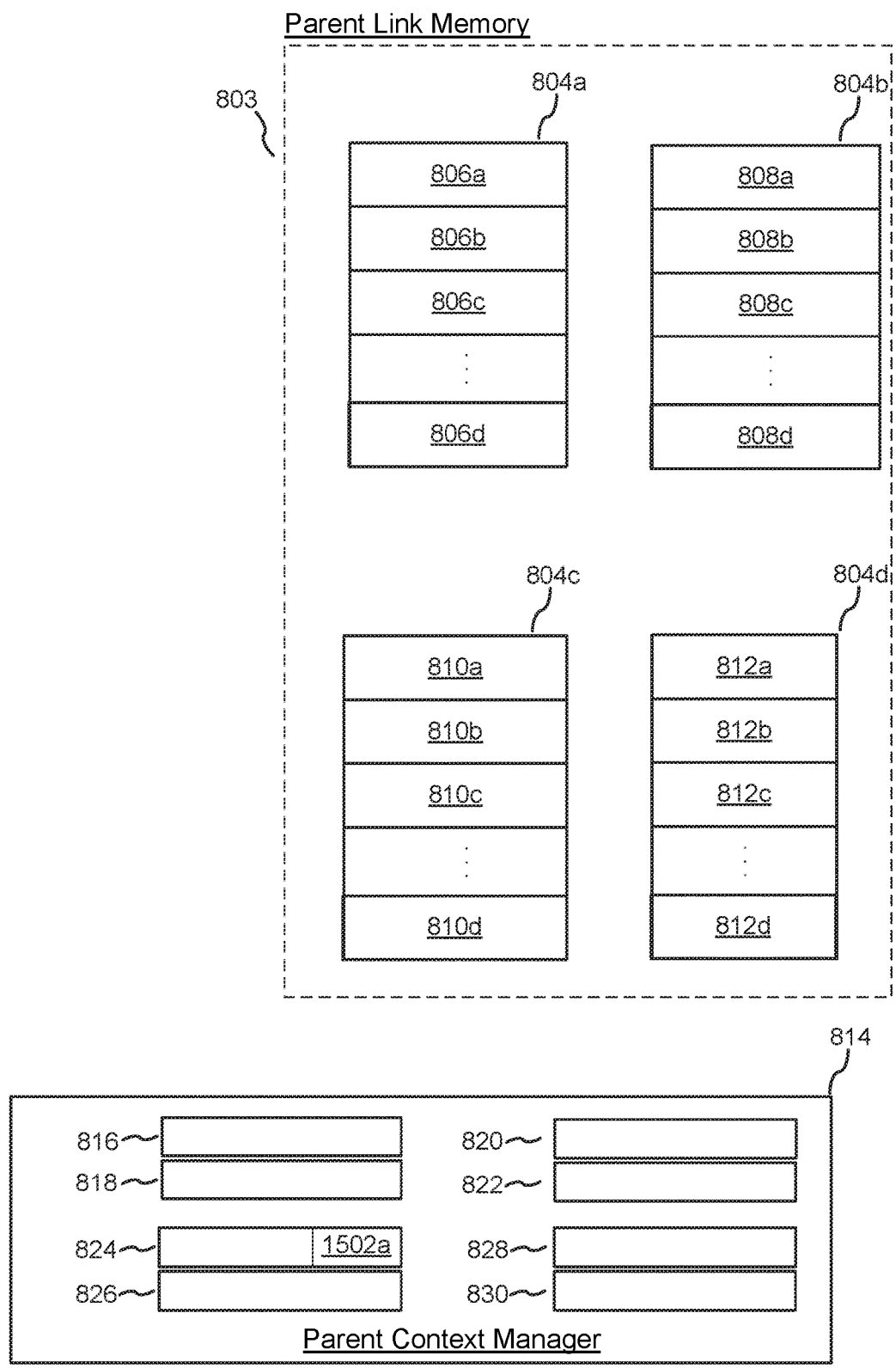
FIG. 18a-d illustrate block diagrams representing the method of generating an interconnected snapshot list including one or more data element set lists including one or more skip lists and the associated snapshot list metadata according to an embodiment.

For an embodiment, the memory system is configured to store data elements with a data element list when it arrives. The data element is stored in a receive context across skip lists and utilizes access constraints including those described herein with regard to implementing skip lists. Upon arrival of the last data element in the data element set, the snapshot is captured and stored in a data element set list using techniques including those described herein. FIG. 17 illustrates a flow diagram for a method of generating an interconnected snapshot list including one or more data element set lists including one or more skip lists and the associated snapshot list metadata according to an embodiment. FIGS. 18a-f illustrate block diagrams representing the state of a portion of a parent distributed-linked list including multiple banks during the method as illustrated in FIG. 17. As illustrated in FIG. 17, the method includes capturing the first snapshot 1602 and storing it in a data element set list. For an embodiment, storing a first snapshot in a data element set list includes generating first snapshot list metadata including a next snapshot pointer to reference to the address in memory for the metadata of the next snapshot in the first snapshot skip list and writing the metadata in a memory system to form the first snapshot list node of the data element set list using techniques for storing and writing metadata including those described herein. For example, as illustrated in FIG. 18a the generated first snapshot list metadata 1502a is written to a second head entry 824.

Figure 18B:
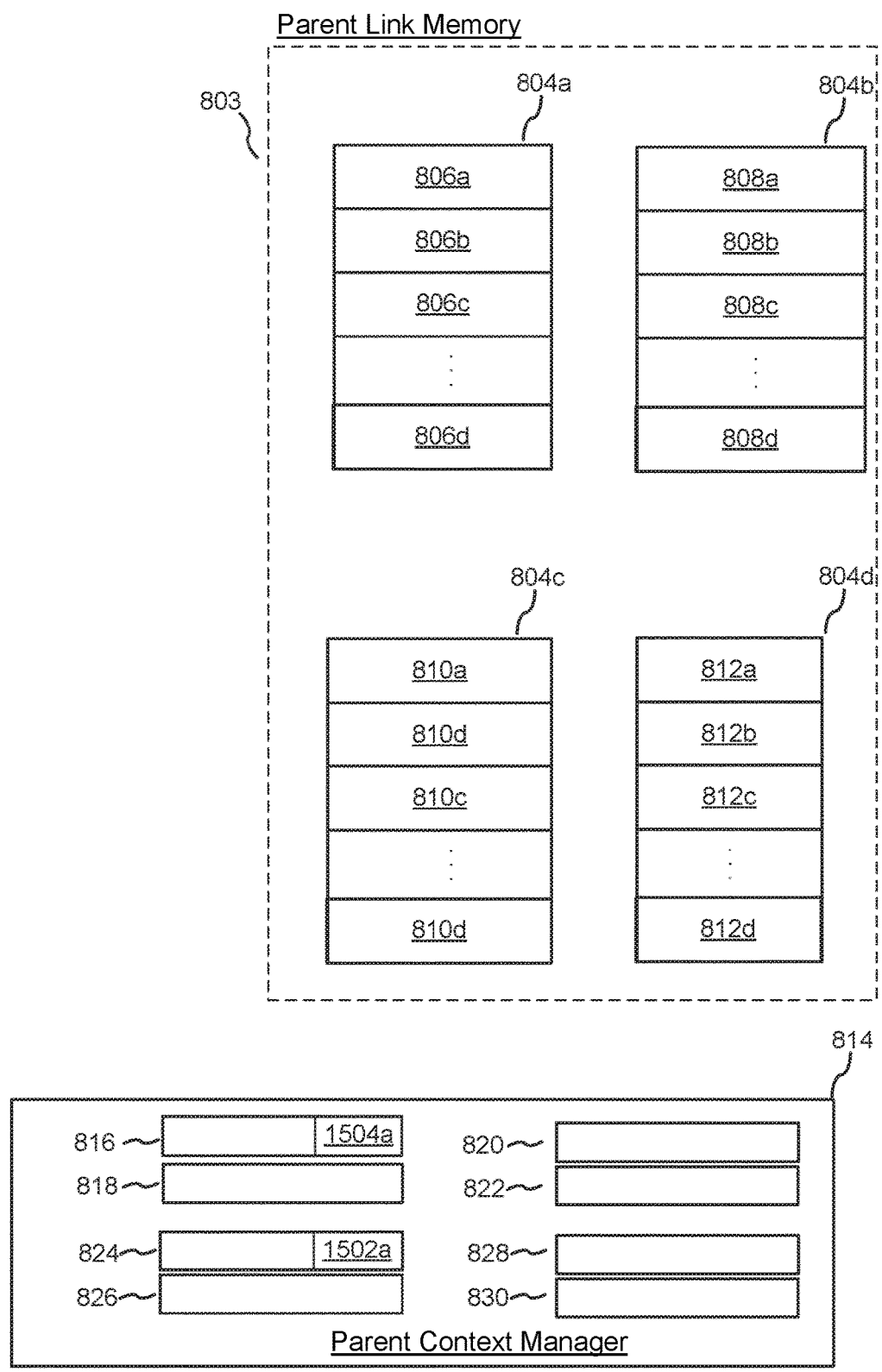
Figure 18C:
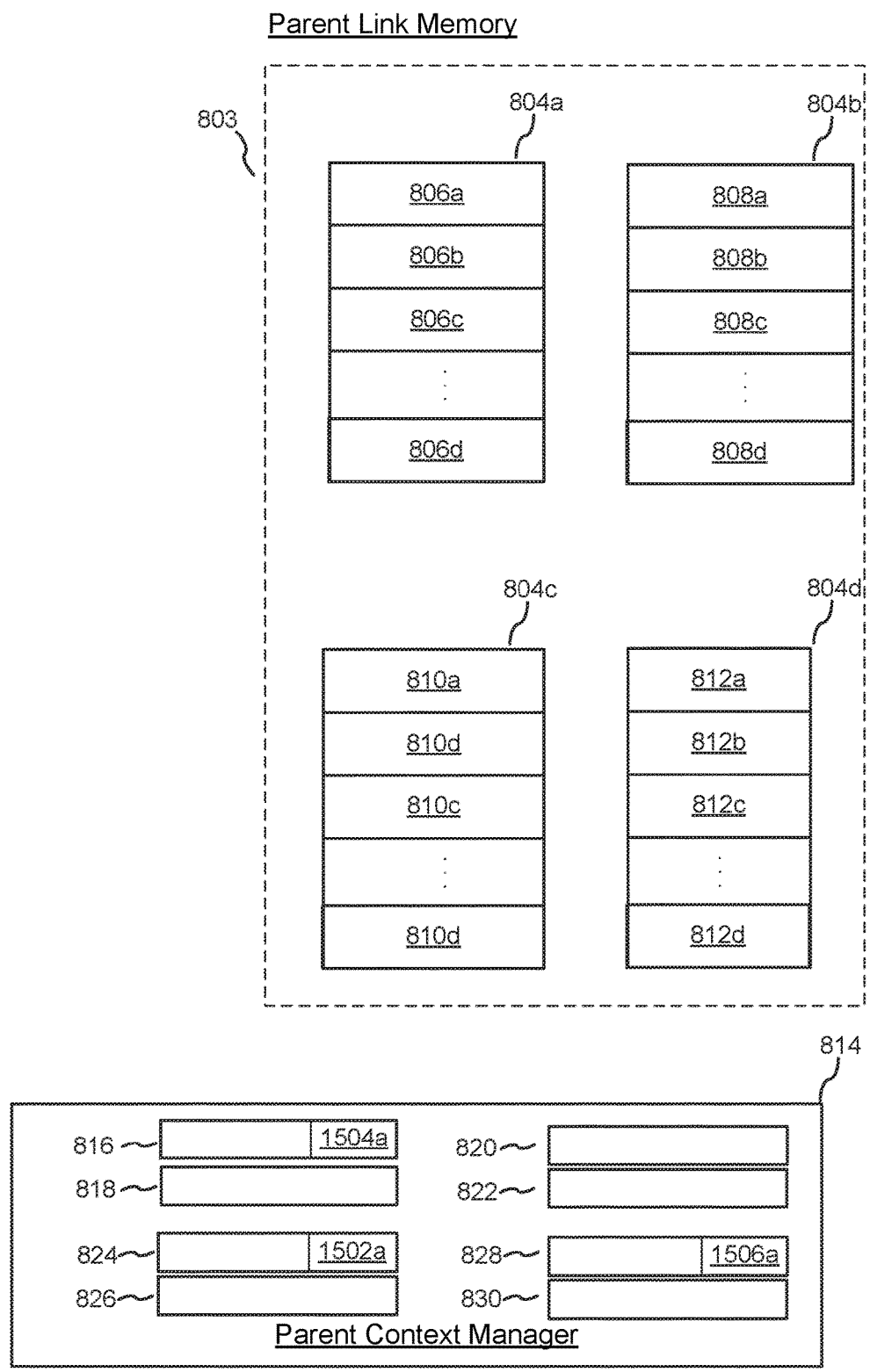
Figure 18D:
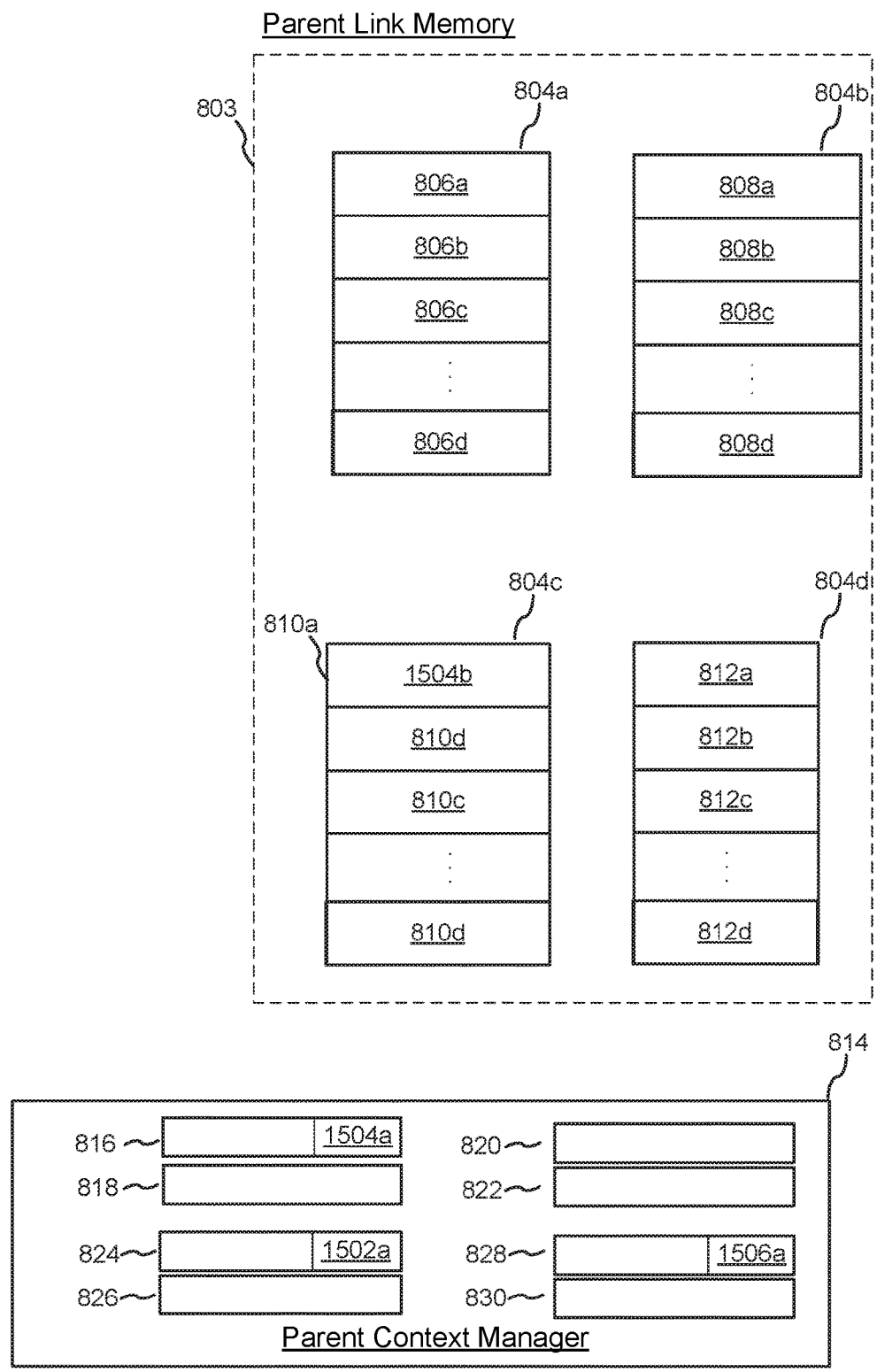

At FIG. 17, the method includes generating second snapshot list metadata including a next snapshot pointer to reference to the address in the memory for the metadata of the next snapshot in a snapshot skip list 1606, if any, and writing the second snapshot list metadata in a memory system for a second snapshot 1608 using techniques including those described herein to form a second snapshot list node of the data element list, which is the second node of the data element set list. For example, as illustrated in FIG. 18b, the generated second snapshot list metadata 1504a is written to a first head entry 816. The method also includes generating third snapshot list metadata including a next snapshot pointer to reference to the address in the memory for the snapshot list metadata of the next snapshot in a snapshot skip list 1610, if any, and writing the third snapshot list metadata in a memory system for a third snapshot 1612 using techniques including those described herein to form a third snapshot list node of the data element set list. For example, as illustrated in FIG. 18c, the generated third snapshot list metadata 1506a is written to a fourth head entry 828. Further, as illustrated in FIG. 17, the method includes generating fourth snapshot list metadata including a next snapshot pointer to reference to the address in the memory for the fourth snapshot list metadata of the next snapshot in a snapshot skip list 1614, if any, and writing the fourth snapshot list metadata in a memory system for a fourth snapshot 1616 using techniques including those described herein to form a fourth snapshot list node of the data element set list, which is the second node of the first snapshot skip list. For example, as illustrated in FIG. 18d, the generated fourth metadata 1504b is written to a location 810a in a third memory bank.

Figure 19:
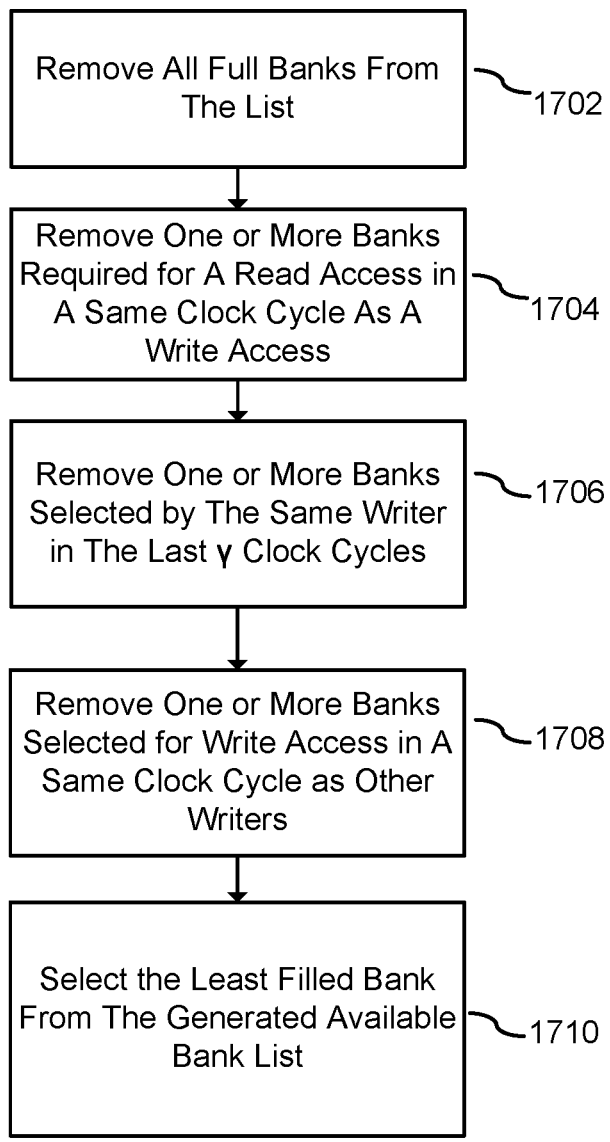
FIG. 19 illustrates a flow diagram for generating an available bank list in a link memory, including child-link memory and parent link memory according to an embodiment.

A method for implementing a write for a memory system configured to generate a hierarchical distributed-linked list from data element lists that include one or more snapshot skip lists includes generating an available bank list in a link memory, including child-link memory and parent link memory. FIG. 19 illustrates a flow diagram for generating an available bank list in a link memory, including child-link memory and parent link memory according to an embodiment. Generating an available bank list may include one or more of removing all full banks from the list 1702; removing a bank required for read access in the same cycle as the write access 1704; removing one or more banks that were selected by the same writer in the last γ clock cycles 1706, where γ is determined based on a desired read rate of the memory system; and removing one or more banks selected for write access in the same clock cycle as the other writers 1708. Further, the method includes selecting the least filled bank from the generated available bank list 1710.

Figure 20:
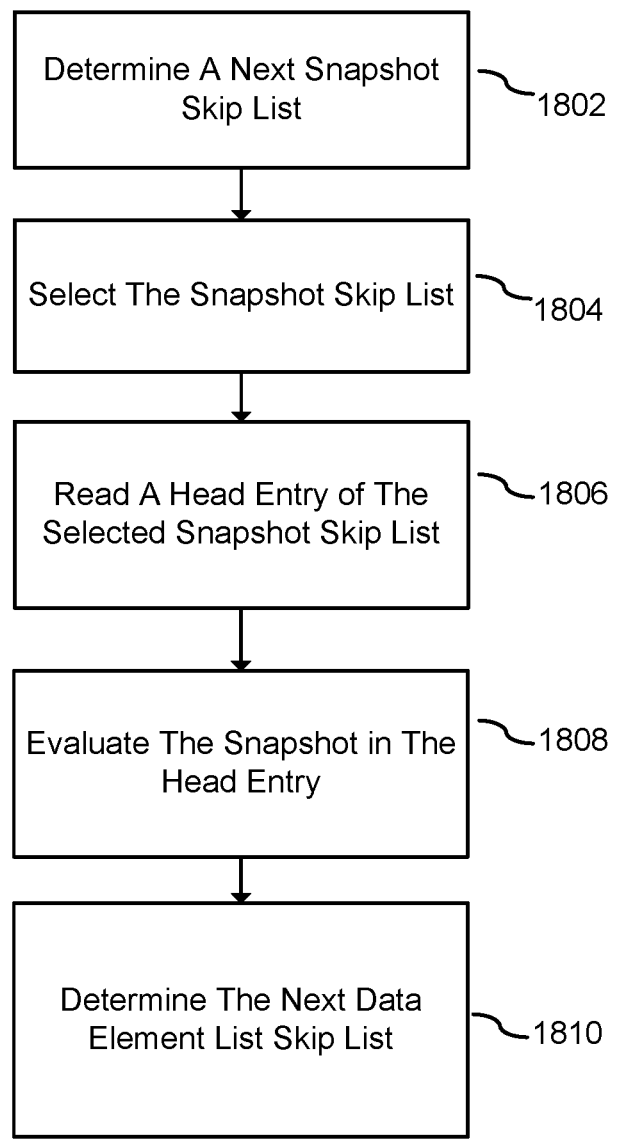
FIG. 20 illustrates a block diagram of an exemplary method for read accesses using one or more snapshot skip lists according to an embodiment.

FIG. 20 illustrates a block diagram of an exemplary method for read accesses using one or more snapshot skip lists according to an embodiment. A method for implementing a read for a memory system configured to generate a hierarchical distributed-linked list from data element lists that include one or more snapshot skip lists includes determining a next snapshot skip list using snapshot sequence identifiers at the head entry of each skip list (1802). The method also includes selecting the snapshot skip list with the lowest sequence identifier at the head entry (1804). The method also includes reading a head entry of the selected snapshot skip list (1806) and evaluating the snapshot in that entry (1808). The snapshot provides the set of data element list skip lists. The method also includes determining the next data element list skip list using data element sequence identifiers at the head entry of each skip list (1810). The method also includes selecting the skip list with the lowest sequence identifier at the heat entry. For an embodiment, a round robin mechanism is used instead of sequence identifiers to determine the next data element or snapshot in a data element list and/or a skip list.

Embodiments described herein may be implemented using one or more of a semiconductor chip, ASIC, FPGA, and using discrete components. Moreover, elements of the memory system may be implemented as one or more cores on a semiconductor chip, such as a system on a chip ("SoC"). Embodiments described herein may also be implemented on a machine, such as a network device and one or more computer systems, including a program storage device. The program storage device includes, but is not limited to, one or more of any of mass storage that is remotely located from the machine, random access memory, non-volatile memory, magnetic or optical storage disks, and other computer readable storage mediums.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A memory system for a network device comprising:
a main memory including memory locations that store data elements;
a link memory including a plurality of memory banks that includes a first memory bank and a second memory bank, each memory bank of the plurality of memory banks having a latency for consecutively executed memory access operations, wherein each memory bank is configured to store a plurality of nodes that each store (i) a respective data-element pointer to the main memory for accessing a respective memory location, and (ii) a respective next-node pointer for accessing a next node in the same memory bank, wherein each of the data-element pointers in the plurality of memory banks points to a respective data element stored the main memory, and wherein one or more data packets are formed by linking the data elements stored in the main memory;
circuitry configured to:
store at least a first data element, a second data element, and a third data element in a first memory location, a second memory location, and a third memory location of the main memory, respectively, wherein the first data element is to be read before the second data element, and wherein the second data element is to be read before the third data element;
store, in a first node of a first memory bank of the plurality of memory banks, (i) a first data-element pointer to the first memory location and (ii) a first next-node pointer for accessing a second node of the first memory bank;
after storing the first data-element pointer in the first node, determine that accessing the second node of the first memory bank to store a second data-element pointer to the second memory location does not satisfy the latency for consecutively executed memory access operations for the first memory bank;
in response to determining that accessing the second node of the first memory bank to store a second data-element pointer to the second memory location of the main memory does not satisfy the latency for consecutively executed memory access operations for the first memory bank, store, in a first node of a second memory bank of the plurality of memory banks, (i) the second data-element pointer to the second memory location of the main memory and (ii) a second next-node pointer for accessing a second node of the second memory bank;
after storing the second data-element pointer in the first node of the second memory bank, determine that accessing the second node of the first memory bank to store a third data-element pointer to the third memory location of the main memory satisfies the latency for consecutively executed memory access operations for the first memory bank; and
in response to determining that accessing the second node of the first memory bank to store a third data-element pointer to the third memory location of the main memory satisfies the latency for consecutively executed memory access operations for the first memory bank, store, in the second node of the first memory bank, (i) the third data-element pointer to the third memory location and (ii) a third next-node pointer for accessing a third node of the first memory bank,
wherein at least the first next-node pointer and the third next-node pointer form a first skip list for the first memory bank, and
wherein at least the second next-node pointer and forms a second skip list for the second memory bank; and
a context manager including a first head entry for the first memory bank and a second head entry for the second memory bank, the context manager configured to maintain at least the first skip list and the second skip list wherein the first head entry stores a first link-memory pointer pointing to the first node of the first memory bank, and wherein the second head entry stores a second link-memory pointer pointing to the first node of the second memory bank.

2. The memory system of claim 1, wherein the context manager is configured to store snapshot list metadata that connects data elements to form multiple data packets.

3. The memory system of claim 2, wherein each head entry is configured to store a sequence identifier indicating an order in which a data element was received at the network device relative to other data elements received at the network device.

4. The memory system of claim 2, wherein each memory bank of the plurality of memory banks includes a single access port.

5. The memory system of claim 1 further comprising a free-entry manager configured to generate an available bank set including one or more link memory locations in the link memory that are not currently used to maintain the data-element pointers and the next-node pointers.

6. The memory system of claim 5, wherein the free-entry manager is configured to generate the available bank set including the one or more link memory locations that are not currently used to maintain the data-element pointers and the next-node pointers such that a write operation to the link memory does not conflict with a read operation.

7. The memory system of claim 5, wherein the free-entry manager is configured to generate the available bank set by removing one or more banks from the available bank set based on a predetermined number of clock cycles since a last write access.

8. The memory system of claim 1, wherein each memory bank of the plurality of memory banks is designated to maintain a respective skip list.

9. The memory system of claim 1,
wherein the plurality of memory banks include a third memory bank, and
wherein the circuitry is configured to:
store a fourth data element in a fourth memory location of the main memory, wherein the fourth data element is to be read after the second data element but before the third data element;
after storing the second data-element pointer in the first node of the second memory bank, determine that (i) accessing the second node of the first memory bank to store a fourth data-element pointer to the fourth memory location does not satisfy the latency for consecutively executed memory access operations for the first memory bank and (ii) accessing the second node of the second memory bank to store the fourth data-element pointer to the fourth memory location does not satisfy the latency for consecutively executed memory access operations for the second memory bank;
in response to determining that (i) accessing the second node of the first memory bank to store a fourth data-element pointer to the fourth memory location does not satisfy the latency for consecutively executed memory access operations for the first memory bank and (ii) accessing the second node of the second memory bank to store the fourth data-element pointer to the fourth memory location does not satisfy the latency for consecutively executed memory access operations for the second memory bank, store, in a first node of the third memory bank, (i) the fourth data-element pointer to the fourth memory location and (ii) a fourth next-node pointer for accessing a second node of the third memory bank.

10. A network device, comprising:
a main memory including memory locations that store data elements;
a link memory including a plurality of memory banks that includes a first memory bank and a second memory bank, each memory bank of the plurality of memory banks having a latency for consecutively executed memory access operations, wherein each memory bank is configured to store a plurality of nodes that each stores (i) a respective data-element pointer to the main memory for accessing a respective memory location, and (ii) a respective next-node pointer for accessing a next node in the same memory bank, wherein each of the data-element pointers in the plurality of memory banks points to a respective data element stored the main memory, and wherein one or more data packets are formed by linking the data elements stored in the main memory;
circuitry configured to:
store at least a first data element, a second data element, and a third data element in a first memory location, a second memory location, and a third memory location of the main memory, respectively, wherein the first data element is to be read before the second data element, and wherein the second data element is to be read before the third data element;
store, in a first node of a first memory bank of the plurality of memory banks, (i) a first data-element pointer to the first memory location and (ii) a first next-node pointer for accessing a second node of the first memory bank;
after storing the first data-element pointer in the first node, determine that accessing the second node of the first memory bank to store a second data-element pointer to the second memory location does not satisfy the latency for consecutively executed memory access operations for the first memory bank;
in response to determining that accessing the second node of the first memory bank to store a second data-element pointer to the second memory location does not satisfy the latency for consecutively executed memory access operations for the first memory bank, store, in a first node of a second memory bank of the plurality of memory banks, (i) the second data-element pointer to the second memory location of the main memory and (ii) a second next-node pointer for accessing a second node of the second memory bank;
after storing the second data-element pointer in the first node of the second memory bank, determine that accessing the second node of the first memory bank to store a third data-element pointer to the third memory location of the main memory satisfies the latency for consecutively executed memory access operations for the first memory bank; and
in response to determining that accessing the second node of the first memory bank to store a third data-element pointer to the third memory location of the main memory satisfies the latency for consecutively executed memory access operations for the first memory bank, store, in the second node of the first memory bank, (i) the third data-element pointer to the third memory location of the main memory and (ii) a third next-node pointer for accessing a third node of the first memory bank, wherein at least the first next-node pointer and the third next-node pointer form a first skip list for the first memory bank, and wherein at least the second next-node pointer and forms a second skip list for the second memory bank; and a context manager including a first head entry for the first memory bank and a second head entry for the second memory bank, the context manager configured to maintain at least the first skip list and the second skip list, wherein the first head entry stores a first link-memory pointer pointing to the first node of the first memory bank, and wherein the second head entry stores a second link-memory pointer pointing to the first node of the second memory bank.

11. The network device of claim 10, wherein the context manager is configured to store snapshot list metadata that connects data elements to form multiple data packets.

12. The network device of claim 11, wherein each head entry is configured to store a sequence identifier indicating an order in which a data element was received at the network device relative to other data elements received at the network device.

13. The network device of claim 11, wherein each memory bank of the plurality of memory banks includes a single access port.

14. The network device of claim 10, further comprising a free-entry manager configured to generate an available bank set including one or more link memory locations in the link memory that are not currently used to maintain the data-element pointers and the next-node pointers.

15. The network device of claim 14, wherein the free-entry manager is configured to generate the available bank set including the one or more link memory locations that are not currently used to maintain the data-element pointers and the next-node pointers such that a write operation to the link memory does not conflict with a read operation.

16. The network device of claim 14, wherein the free-entry manager is configured to generate the available bank set by removing one or more banks from the available bank set based on a predetermined number of clock cycles since a last write access.

17. The network device of claim 10, wherein each memory bank of the plurality of memory banks is designated to maintain a respective skip list.

18. The network device of claim 10,
wherein the plurality of memory banks include a third memory bank, and
wherein the circuitry is configured to:
store a fourth data element in a fourth memory location of the main memory, wherein the fourth data element is to be read after the second data element but before the third data element;
after storing the second data-element pointer in the first node of the second memory bank, determine that (i) accessing the second node of the first memory bank to store a fourth data-element pointer to the fourth memory location does not satisfy the latency for consecutively executed memory access operations for the first memory bank and (ii) accessing the second node of the second memory bank to store the fourth data-element pointer to the fourth memory location does not satisfy the latency for consecutively executed memory access operations for the second memory bank;
in response to determining that (i) accessing the second node of the first memory bank to store a fourth data-element pointer to the fourth memory location does not satisfy the latency for consecutively executed memory access operations for the first memory bank and (ii) accessing the second node of the second memory bank to store the fourth data-element pointer to the fourth memory location does not satisfy the latency for consecutively executed memory access operations for the second memory bank, store, in a first node of the third memory bank, (i) the fourth data-element pointer to the fourth memory location and (ii) a fourth next-node pointer for accessing a second node of the third memory bank.

19. A method for operating a network device, the method comprising:
storing data elements in a main memory;
storing, in each memory bank of a link memory including a plurality of memory banks that includes a first memory bank and a second memory bank, a plurality of nodes that each stores (i) a respective data-element pointer to the main memory for accessing a respective memory location, and (ii) a respective next-node pointer for accessing a next node in the same memory bank, wherein each of the data-element pointer in the plurality of memory banks points to a respective data element stored the main memory, wherein one or more data packets are formed by linking the data elements stored in the main memory, and wherein each memory bank of the plurality of memory banks has a latency for consecutively executed memory access operations;
storing at least a first data element, a second data element, and a third data element in a first memory location, a second memory location, and a third memory location of the main memory, respectively, wherein the first data element is to be read before the second data element, and wherein the second data element is to be read before the third data element;
storing, in a first node of a first memory bank of the plurality of memory banks, (i) a first data-element pointer to the first memory location and (ii) a first next-node pointer for accessing a second node of the first memory bank;
after storing the first data-element pointer in the first node, determining that accessing the second node of the first memory bank to store a second data-element pointer to the second memory location does not satisfy the latency for consecutively executed memory access operations for the first memory bank;
in response to determining that accessing the second node of the first memory bank to store a second data-element pointer to the second memory location does not satisfy the latency for consecutively executed memory access operations for the first memory bank, storing, in a first node of a second memory bank of the plurality of memory banks, (i) the second data-element pointer to the second memory location of the main memory and (ii) a second next-node pointer for accessing a second node of the second memory bank;
after storing the second data-element pointer in the first node of the second memory bank, determining that accessing the second node of the first memory bank to store a third data-element pointer to the third memory location of the main memory satisfies the latency for consecutively executed memory access operations for the first memory bank;
in response to determining that accessing the second node of the first memory bank to store a third data-element pointer to the third memory location of the main memory satisfies the latency for consecutively executed memory access operations for the first memory bank, storing, in the second node of the first memory bank, (i) the third data-element pointer to the third memory location of the main memory and (ii) a third next-node pointer for accessing a third node of the first memory bank, wherein at least the first next-node pointer and the third next-node pointer form a first skip list for the first memory bank, and wherein at least the second next-node pointer and forms a second skip list for the second memory bank;

storing, in a first head entry of a context manager, a first link-memory pointer pointing to the first node of the first memory bank;

storing, in a second head entry of the context manager, a second link-memory pointer pointing to the first node of the second memory bank; and using the first head entry and the second head entry to access the data elements according to the first skip list and the second skip list, respectively.

20. The method of claim 19, comprising storing, by the context manager, snapshot list metadata that connects data elements to form multiple data packets.

21. The method of claim 20, comprising using each head entry to store a sequence identifier indicating an order in which a data element was received at the network device.

22. The method of claim 20, comprising generating an available bank set including one or more link memory locations in the link memory that are not currently used to maintain the data-element pointers and the next-node pointers.

23. The method of claim 22, wherein generating the available bank set comprises generating the available bank set including the one or more link memory locations that are not currently used to maintain the data-element pointers and the next-node pointers such that a write operation to the link memory does not conflict with a read operation.

24. The method of claim 22, wherein generating the available bank set comprises generating the available bank set by removing one or more banks from the available bank set based on a predetermined number of clock cycles since a last write access.

* * * * *

UNITED STATES PATENT AND TRADEMARK OFFICE
CERTIFICATE OF CORRECTION

PATENT NO. : 9,785,367 B2  
APPLICATION NO. : 15/192820  
DATED : October 10, 2017  
INVENTOR(S) : William Brad Matthews et al.

Page 1 of 1

It is certified that error appears in the above-identified patent and that said Letters Patent is hereby corrected as shown below:

In Claim 1, Column 22, Line 4, after "stored" insert -- in --.

In Claim 1, Column 22, Line 59, after "pointer" delete "and".

In Claim 1, Column 22, Line 64, after "list" insert -- , --. (Second Occurrence)

In Claim 10, Column 24, Line 16, after "stored" insert -- in --.

In Claim 19, Column 26, Line 24, after "stored" insert -- in --.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*